United States Patent
Yuza

(10) Patent No.: US 9,417,431 B2
(45) Date of Patent: *Aug. 16, 2016

(54) IMAGING LENS

(71) Applicant: KANTATSU CO., LTD., Yaita-shi, Tochigi (JP)

(72) Inventor: Shingo Yuza, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,617

(22) Filed: Nov. 12, 2015

(65) Prior Publication Data

US 2016/0062080 A1 Mar. 3, 2016

Related U.S. Application Data

(62) Division of application No. 14/463,256, filed on Aug. 19, 2014, now Pat. No. 9,223,062.

(30) Foreign Application Priority Data

Nov. 28, 2013 (JP) .................................. 2013-245868

(51) Int. Cl.
*G02B 13/18* (2006.01)
*G02B 3/02* (2006.01)
(Continued)

(52) U.S. Cl.
CPC ................ *G02B 13/004* (2013.01); *G02B 3/04* (2013.01); *G02B 9/34* (2013.01); *G02B 1/041* (2013.01); *G02B 5/005* (2013.01); *G02B 13/001* (2013.01); *G02B 13/0015* (2013.01); *G02B 13/18* (2013.01)

(58) Field of Classification Search
CPC ........ G02B 13/004; G02B 9/34; G02B 13/18; G02B 13/0015; G02B 1/041; G02B 13/001; G02B 5/005

USPC .......................... 359/715, 738–740, 771–773
See application file for complete search history.

(56) References Cited

U.S. PATENT DOCUMENTS 8,477,434 B2   7/2013  Kubota et al.
8,508,648 B2   8/2013  Kubota et al.
(Continued)

FOREIGN PATENT DOCUMENTS

CN   102253470 A   11/2011
CN   102902044 A    1/2013
(Continued)

*Primary Examiner* — Evelyn A Lester
(74) *Attorney, Agent, or Firm* — Westerman, Hattori, Daniels & Adrian, LLP

(57) ABSTRACT

A compact, wide view-field imaging lens with a small F-value which corrects aberrations properly. Its elements are arranged in order from an object side to an image side: an aperture stop, positive first lens having convex surfaces on the object and image sides, negative second lens having a concave object-side surface near an optical axis, positive meniscus third lens having a convex image-side surface, and negative meniscus double-sided aspheric fourth lens having a concave image-side surface near the optical axis. Its F-value is smaller than 2.4 and it satisfies conditional expressions (1) to (3) below:

$$0.15 < f12/f34 < 0.5 \quad (1)$$

$$0.1 < |r1/r2| < 0.5 \quad (2)$$

$$1.0 < f1/f3 < 1.6 \quad (3)$$

where
f1: first lens focal length
f3: third lens focal length
f12: composite focal length of the first and second lenses
f34: composite focal length of the third and fourth lenses
r1: curvature radius of the first lens object-side surface
r2: curvature radius of the first lens image-side surface.

8 Claims, 16 Drawing Sheets

(51) Int. Cl.
*G02B 9/08* (2006.01)
*G02B 9/34* (2006.01)
*G02B 13/00* (2006.01)
*G02B 3/04* (2006.01)
G02B 1/04 (2006.01)
G02B 5/00 (2006.01)

(56) References Cited

U.S. PATENT DOCUMENTS

| | | | |
|---|---|---|---|
| 8,576,499 | B2 | 11/2013 | Okano |
| 9,223,062 | B2 * | 12/2015 | Yuza ............................ 359/715 |
| 2004/0012861 | A1 | 1/2004 | Yamaguchi |
| 2005/0105194 | A1 | 5/2005 | Matsui et al. |
| 2008/0024882 | A1 | 1/2008 | Park et al. |
| 2009/0268312 | A1 | 10/2009 | Onoda |
| 2011/0115962 | A1 | 5/2011 | Chen et al. |
| 2012/0013998 | A1 | 1/2012 | Tang et al. |
| 2012/0044403 | A1 | 2/2012 | Tang et al. |
| 2012/0075723 | A1 | 3/2012 | Takei |
| 2012/0086848 | A1 | 4/2012 | Tsai et al. |
| 2012/0147249 | A1 | 6/2012 | Okano |
| 2012/0194925 | A1 | 8/2012 | Teraoka |
| 2012/0293875 | A1 | 11/2012 | Tsai et al. |
| 2012/0327522 | A1 | 12/2012 | Tsai et al. |
| 2013/0003194 | A1 | 1/2013 | Suzuki et al. |
| 2013/0044379 | A1 | 2/2013 | Hsieh et al. |
| 2013/0070348 | A1 | 3/2013 | Ise et al. |
| 2013/0188264 | A1 | 7/2013 | Hashimoto |
| 2014/0198397 | A1 | 7/2014 | Sekine |
| 2015/0124149 | A1 | 5/2015 | Tang et al. |

FOREIGN PATENT DOCUMENTS

| | | |
|---|---|---|
| JP | 2008-33327 A | 2/2008 |
| JP | 2009-265245 A | 11/2009 |

* cited by examiner

IMAGING LENS

CROSS-REFERENCE TO RELATED APPLICATION

This is a continuation application of U.S. patent application Ser. No. 14/463,256, filed on Aug. 19, 2014, which claims the benefit of priority from the prior Japanese Patent Application No. 2013-245868, filed on Nov. 28, 2013, the entire contents of which are incorporated herein by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile mobile terminals such as smart phones, mobile phones and PDAs (Personal Digital Assistants), and game consoles and information terminals such as PCs.

2. Description of the Related Art

In recent years, the market of mobile terminals including smart phones has been ever-expanding, and in the field of cameras built in mobile terminals, products which cope with an increase in the number of pixels have become mainstream. Imaging lenses for such cameras are strongly expected to provide higher resolution and be more compact and low-profile and also to realize a lens system which ensures high brightness to cope with an increase in the number of pixels and provides a wide field of view to capture an image of an object over a wide range.

Many types of imaging lenses composed of four constituent lenses (four-element lenses) which are relatively compact and provide high performance have been proposed as imaging lenses which meet the trend toward higher performance as mentioned above.

For example, JP-A-2008-033327 (Patent Document 1) discloses an imaging lens which includes a first lens with positive refractive power as a biconvex lens, a second lens with negative refractive power as a meniscus lens having a convex surface on an object side, a third lens with positive refractive power as a meniscus lens having a convex surface on an image side, and a fourth lens with negative refractive power, in which the length of the overall optical system in the optical axis direction and the ratio of the focal length of the first lens to the overall focal length are set within appropriate ranges in order to achieve compactness and high performance.

JP-A-2009-265245 (Patent Document 2) discloses an imaging lens which includes, in order from an object side, a first lens with positive refractive power having a convex surface on the object side, an aperture stop for adjusting the quantity of light, a second lens with negative refractive power, a third lens with positive refractive power having a concave surface on the object side, and a fourth lens with negative refractive power, in which the ratio between the focal length of the overall optical system and the focal length of the second lens and the ratio between the focal length of the second lens and the curvature radius of the object-side surface of the second lens are set within appropriate ranges in order to achieve compactness and high performance.

The imaging lens described in Patent Document 1 is relatively compact in which TLA/2ih is about 1.0 where TLA denotes total track length and 2ih denotes the diagonal length of the effective imaging plane of the image sensor. However, its F-value is about 3.0, so its brightness is not considered to be sufficient for an image sensor which deals with an increasing number of pixels. Also, its half field of view is in the range of 31 to 32 degrees, which is insufficient to meet the demand for a wide field of view.

The imaging lens described in Patent Document 2 is also relatively compact in which TLA/2ih is about 1.0. However, its F-value is about 2.8, so its brightness is not considered to be sufficient for an image sensor which deals with an increasing number of pixels. Also, its half field of view is in the range of 31 to 32 degrees, which is insufficient to meet the demand for a wide field of view.

Therefore, in the conventional technology, it is difficult to meet the demands for compactness, a wider field of view and a small F-value at the same time.

SUMMARY OF THE INVENTION

The present invention has been made in view of the above problem, and an object thereof is to provide an imaging lens which meets the demand for compactness, provides a small F-value and a wide field of view and corrects various aberrations properly.

Here, a "compact" imaging lens means an imaging lens in which TLA/2ih is 0.9 or less, where TLA denotes total track length and 2ih denotes the diagonal length of the effective imaging plane of the image sensor. "Total track length" denotes the distance on the optical axis from the object-side surface of an optical element located nearest to the object to the image plane in an optical system without an IR cut filter or the like. Here, a "small F-value" means that the F-value is less than 2.4, and a "wide field of view" means that the field of view is 70 degrees or more.

According to one aspect of the present invention, there is provided an imaging lens for a solid-state image sensor in which elements are arranged in the following order from an object side to an image side: an aperture stop; a first lens with positive refractive power having a convex surface on each of the object side and the image side; a second lens with negative refractive power having a concave surface on the object side near an optical axis; a third lens with positive refractive power as a meniscus lens having a convex surface on the image side; and a fourth lens with negative refractive power as a meniscus double-sided aspheric lens having a concave surface on the image side near the optical axis. Its F-value is smaller than 2.4, and it satisfies conditional expressions (1), (2), and (3) below:

$$0.15 < f12/f34 < 0.5 \tag{1}$$

$$0.1 < |r1/r2| < 0.5 \tag{2}$$

$$1.0 < f1/f3 < 1.6 \tag{3}$$

where
f1: focal length of the first lens
f3: focal length of the third lens
f12: composite focal length of the first lens and the second lens
f34: composite focal length of the third lens and the fourth lens
r1: curvature radius of the object-side surface of the first lens
r2: curvature radius of the image-side surface of the first lens.

The imaging lens with the above-described configuration has a virtually telephoto lens system in which positive, negative, positive, and negative lenses are arranged in order from the object side, so it is easy to shorten the total track length. The refractive power of the imaging lens is appropriately distributed to its constituent lenses, and each constituent lens has an appropriate shape to shorten the total track length and correct various aberrations.

The first lens has a biconvex shape in which the positive refractive power is appropriately distributed to the both convex surfaces so as to make the lens surface curvature radius small, suppress an increase in manufacturing error sensitivity, and shorten the total track length. The surfaces of the first lens may be both aspheric and if so, spherical aberrations which occur on the first lens can be corrected.

The second lens corrects chromatic aberrations which occur on the first lens, and also effectively suppresses paraxial spherical aberrations, off-axial astigmatism and coma aberrations. The surfaces of the second lens may be both aspheric and if so, off-axial aberrations as mentioned above are corrected or suppressed more effectively due to the aspheric shapes.

The third lens and the fourth lens are responsible for correction of off-axial astigmatism, reduction of astigmatic difference and correction of distortion. The aspheric shapes of the both surfaces of the fourth lens make it easy to control the angle of a chief ray incident on the image sensor (hereinafter called CRA or Chief Ray Angle). The third lens may have an aspheric surface and if so, various aberrations are corrected more effectively.

The aperture stop is located between the intersection of the object-side surface of the first lens and the optical axis and the periphery of the object-side surface of the first lens. The aperture stop is located nearest to the object in the lens system and the exit pupil is remote from the image plane, thereby preventing the CRA from becoming a large angle. This reduces the burden on the fourth lens to control the CRA and prevents the fourth lens from being necessitated to have a sharply curved aspheric surface, thereby suppressing a ghost phenomenon attributable to internal reflection. If the aperture stop is located nearer to the object than the first lens with an air gap between it and the first lens, CRA control would be easier but the lens barrel in which the aperture stop is formed should be located nearer to the object than the first lens, so it would be difficult to achieve compactness.

According to the present invention, the imaging lens is designed to have an F-value smaller than 2.4 in order to provide sufficient brightness for an image sensor which deals with an increasing number of pixels.

The conditional expression (1) defines an appropriate range for the ratio of the composite focal length of the first and second lenses to the composite focal length of the third and fourth lenses, and indicates a condition to control chromatic aberrations and other aberrations within proper ranges. If the value is above the upper limit of the conditional expression (1), the composite focal length of the first and second lenses would be relatively too long with respect to the composite focal length of the third and fourth lenses, making it difficult to correct chromatic aberrations and other aberrations and achieve high imaging performance. On the other hand, if the value is below the lower limit of the conditional expression (1), the composite focal length of the first and second lenses would be relatively too short with respect to the composite focal length of the third and fourth lenses, undesirably the refractive power of the lens system would be concentrated on the first and second lenses, leading to an increase in manufacturing error sensitivity.

The conditional expression (2) defines an appropriate range for the paraxial shape of the first lens, and indicates a condition to shorten the total track length and suppress spherical aberrations. If the value is above the upper limit of the conditional expression (2), the refractive power of the object-side surface of the first lens would be too weak to shorten the total track length. On the other hand, if the value is below the lower limit of the conditional expression (2), the refractive power of the object-side surface of the first lens would be too strong, causing spherical aberrations to increase.

The conditional expression (3) defines an appropriate range for the relation between the refractive power of the third lens and the refractive power of the first lens, and indicates a condition to suppress an increase in manufacturing error sensitivity of the first lens and keep the total track length short. If the value is above the upper limit of the conditional expression (3), the positive refractive power of the third lens would be relatively too small to shorten the total track length. On the other hand, if the value is below the lower limit of the conditional expression (3), the positive refractive power of the first lens would be too large, undesirably leading to an increase in manufacturing error sensitivity.

Generally, in an effort to make the lens system have a small F-value, there is a tendency that correction of off-axial aberrations is particularly difficult because of an increase in the amount of luminous flux entering the lens. However, when the above lens configuration is employed and the conditional expressions (1) to (3) are satisfied at the same time, it is possible to provide an imaging lens with a small F-value which corrects various aberrations properly and achieves more compactness.

Preferably, the imaging lens according to the present invention satisfies a conditional expression (4) below:

$$-6.5 < r3/f < -0.7 \quad (4)$$

where
f: focal length of the overall optical system of the imaging lens
r3: curvature radius of the object-side surface of the second lens.

The conditional expression (4) defines an appropriate range for the ratio of the curvature radius of the object-side surface of the second lens to the focal length of the overall optical system of the imaging lens, and indicates a condition to keep spherical aberrations within a proper range. If the value is above the upper limit of the conditional expression (4), the refractive power of the object-side surface of the second lens would be too weak, making it difficult to correct spherical aberrations which occur on the first lens. On the other hand, if the value is below the lower limit of the conditional expression (4), the refractive power of the object-side surface of the second lens would be too strong and though spherical aberrations would be corrected effectively, the refractive power of the second lens would be too strong, undesirably leading to an increase in manufacturing error sensitivity.

Preferably, the imaging lens according to the present invention satisfies a conditional expression (5) below:

$$3.3 < r7/r8 < 7.5 \quad (5)$$

where
r7: curvature radius of the object-side surface of the fourth lens
r8: curvature radius of the image-side surface of the fourth lens.

The conditional expression (5) defines an appropriate range for the paraxial shape of the fourth lens. If the value is above the upper limit of the conditional expression (5), the negative refractive power of the fourth lens would be stronger and the back focus would be longer, making it difficult to shorten the total track length. On the other hand, if the value is below the lower limit of the conditional expression (5), the negative refractive power of the fourth lens would be weaker and the back focus would be shorter, making it difficult to obtain space in which a filter or the like is inserted, though it would be easy to shorten the total track length.

Preferably, the imaging lens according to the present invention satisfies a conditional expression (6) below:

$$TLA/2ih<0.9 \quad (6)$$

where

TLA: distance on the optical axis from the objet-side surface of an optical element located nearest to the object to an image plane without a filter or the like (total track length)

ih: maximum image height.

The conditional expression (6) defines an appropriate range for the ratio of total track length to maximum image height, and indicates a condition to achieve compactness. If the value is above the upper limit of the conditional expression (6), the total track length would be too long to make the imaging lens compact, though the freedom in the shape of each constituent lens would be increased and it would be easy to enhance the performance.

More preferably, the imaging lens according to the present invention satisfies a conditional expression (6a) below:

$$TLA/2ih<0.85. \quad (6a)$$

Preferably, the imaging lens according to the present invention satisfies a conditional expression (7) below:

$$ih/f>0.7 \quad (7)$$

where f: focal length of the overall optical system of the imaging lens ih: maximum image height.

The conditional expression (7) defines an appropriate range for the ratio of maximum image height to the focal length of the overall optical system of the imaging lens, and indicates a condition to provide a wide field of view and high imaging performance. If the value is below the lower limit of the conditional expression (7), the focal length of the overall optical system of the imaging lens would be too long to achieve compactness and provide a wide field of view.

More preferably, the imaging lens according to the present invention satisfies a conditional expression (7a) below:

$$ih/f>0.75 \quad (7a)$$

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, and 15 are schematic views showing the general configurations of the imaging lenses in Examples 1 to 8 according to this embodiment, respectively. Since all these examples have the same basic lens configuration, the general configuration of an imaging lens according to this embodiment is explained below referring to the schematic view of Example 1.

Figure 1:
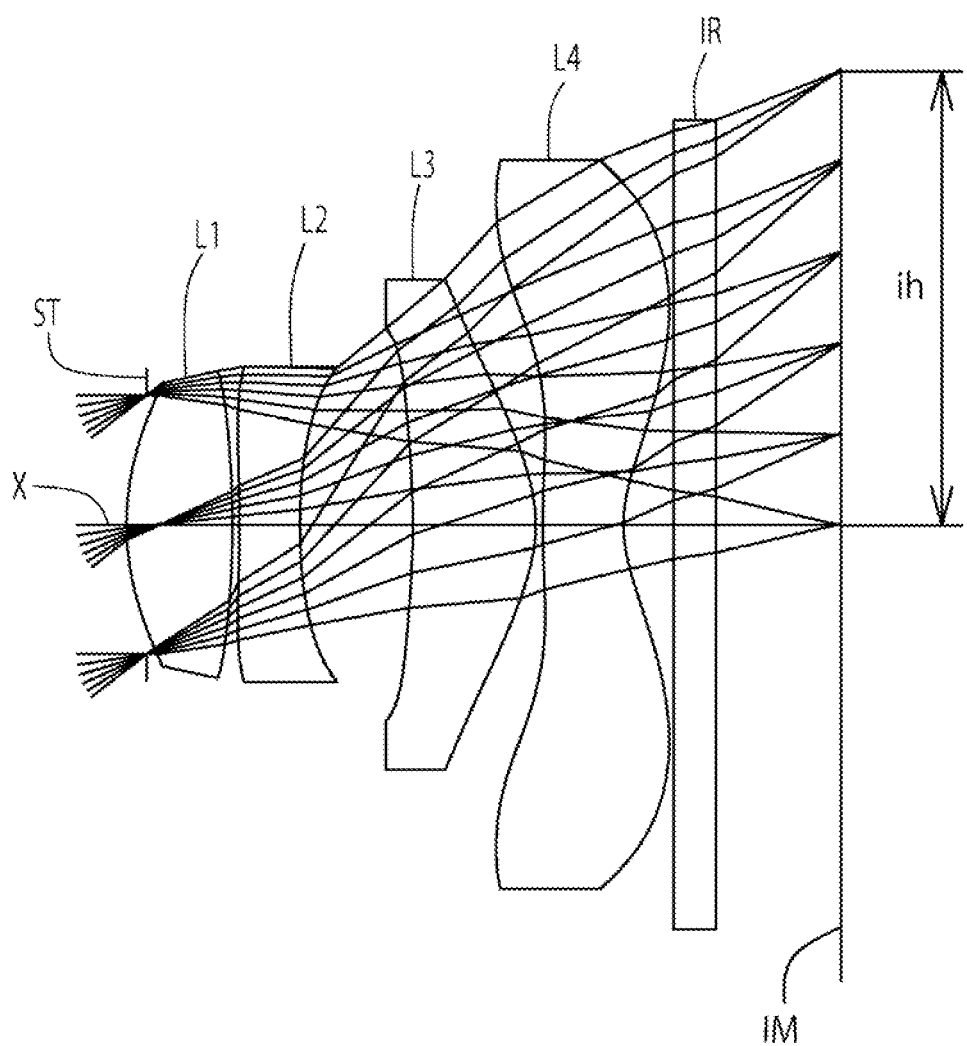
FIG. 1 is a schematic view showing the general configuration of an imaging lens in Example 1.

As shown in FIG. 1, in the imaging lens according to this embodiment, elements are arranged in the following order from an object side to an image side: an aperture stop ST, a first lens L1 with positive refractive power having a convex surface on each of the object side and the image side, a second lens L2 with negative refractive power having a concave surface on the object side near an optical axis X, a third lens L3 with positive refractive power as a meniscus lens having a convex surface on the image side, and a fourth lens L4 with negative refractive power as a meniscus double-sided aspheric lens having a concave surface on the image side near the optical axis X. This refractive power arrangement may be virtually that of a telephoto lens system, which implies that it is easy to shorten the total track length. The aperture stop ST is located nearer to the image plane IM than the apex of the object-side surface of the first lens L1.

A filter IR is located between the fourth lens L4 and the image plane IM. The filter IR is omissible.

In the imaging lens composed of four constituent lenses as mentioned above, the first lens L1 is a biconvex lens and its positive refractive power is appropriately distributed to the both convex surfaces so as to make the lens surface curvature radius small, suppress an increase in manufacturing error sensitivity, and shorten the total track length. Each surface of the first lens L1 has an appropriate aspheric shape to correct spherical aberrations which occur on the first lens L1.

Figure 13:
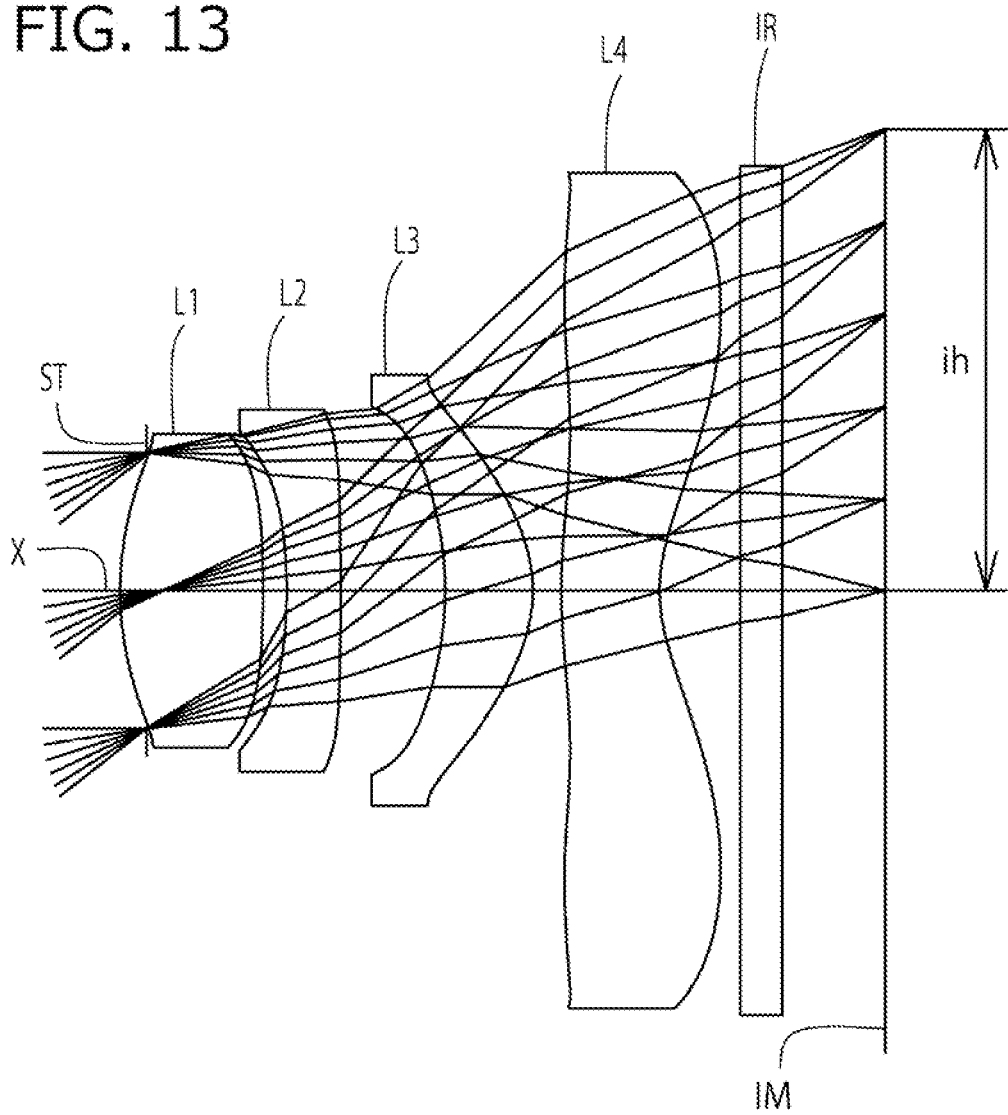
FIG. 13 is a schematic view showing the general configuration of an imaging lens in Example 7.

The second lens L2 has a biconcave shape near the optical axis X, effectively corrects chromatic aberrations which occur on the first lens L1, and also suppresses paraxial spherical aberrations, off-axial astigmatism, and coma aberrations effectively. The shape of the second lens L2 is not limited to a biconcave shape. For example, FIG. 13 shows Example 7 in which the second lens L2 is a meniscus lens in which the object-side surface is concave near the optical axis X and the image-side surface is convex near the optical axis X. Although in Example 1 shown in FIG. 1, the second lens L2 is shaped so that the both aspheric surfaces change in shape uniformly from the center to the periphery, the peripheral portions of the object-side surface and image-side surface may be curved toward the object side as in Example 7 shown in FIG. 13. When it has aspheric shapes as shown in FIG. 13, off-axial aberrations are corrected effectively.

The both surfaces of each of the third lens L3 and the fourth lens L4 have appropriate aspheric shapes to make it easy to correct off-axial astigmatism and distortion and reduce astigmatic difference. The image-side surface of the fourth lens L4 has an aspheric shape with a pole-change point in a position off the optical axis X, and has the function to control the CRA. A "pole-change point" here means a point on an aspheric surface at which a tangential plane intersects the optical axis X perpendicularly.

The aperture stop ST is located between the intersection of the object-side surface of the first lens L1 and the optical axis X and the periphery of the object-side surface of the first lens L1, so the exit pupil is remote from the image plane IM, thereby preventing the CRA from becoming a large angle. Furthermore, the image-side surface of the fourth lens L4 has an aspheric shape in which the peripheral portion is curved toward the object side. Due to this aspheric shape, the negative refractive power of the fourth lens L4 gradually decreases as the distance from the optical axis X increases. Alternatively, as the distance from the optical axis X increases, the negative refractive power of the fourth lens L4 gradually decreases and changes to positive refractive power in the peripheral portion. This change in refractive power allows the fourth lens L4 to control the CRA. In connection with CRA control by the fourth lens L4, if the aspheric image-side surface of the fourth lens L4 is sharply curved toward the object side, the positive refractive power in the peripheral portion is stronger and the CRA is closer to perpendicularity. In that case, however, internally reflected light generated on the peripheral portion of the image-side surface of the fourth lens L4 is likely to impinge on the inner surface of the object-side surface of the fourth lens L4 at an angle which induces total reflection. If totally reflected unwanted light rays reach the image plane IM, a ghost phenomenon may occur, causing deterioration in image quality. In this embodiment, since the aperture stop ST is located nearest to the object in the lens system to make the exit pupil remote from the image plane IM to prevent the CRA from becoming a large angle, the burden on the aspheric surface of the peripheral portion of the fourth lens L4 to control the CRA is reduced and also occurrence of a ghost phenomenon is suppressed.

In the imaging lens according to this embodiment, all the constituent lenses are made of plastic material. Therefore, the manufacturing process is simplified, and the imaging lens can be mass-produced at low cost. Also, all the lens surfaces are aspheric. Since all the lens surfaces have appropriate aspheric shapes, aberrations are corrected more properly.

The imaging lens according to the present invention satisfies conditional expressions below:

$$0.15 < f12/f34 < 0.5 \quad (1)$$

$$0.1 < |r1/r2| < 0.5 \quad (2)$$

$$1.0 < f1/f3 < 1.6 \quad (3)$$

$$-6.5 < r3/f < -0.7 \quad (4)$$

$$3.3 < r7/r8 < 7.5 \quad (5)$$

$$TLA/2ih < 0.9 \quad (6)$$

$$ih/f > 0.7 \quad (7)$$

where
f: focal length of the overall optical system of the imaging lens
f1: focal length of the first lens L1
f3: focal length of the third lens L3
f12: composite focal length of the first lens L1 and the second lens L2
f34: composite focal length of the third lens L3 and the fourth lens L4
r1: curvature radius of the object-side surface of the first lens L1
r2: curvature radius of the image-side surface of the first lens L1
r3: curvature radius of the object-side surface of the second lens L2
r7: curvature radius of the object-side surface of the fourth lens L4
r8: curvature radius of the image-side surface of the fourth lens L4
TLA: distance on the optical axis X from the objet-side surface of an optical element located nearest to the object to the image plane IM without the filter IR (total track length)
ih: maximum image height.

In this embodiment, all the lens surfaces are aspheric. The aspheric shapes of these lens surfaces are expressed by the following equation, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TLA denotes total track length without the filter IR. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown below in Table 1.

TABLE 1

| Example 1 in mm |
|---|
| f = 2.89 |
| Fno = 2.24 |
| ω(deg) = 37.7 |
| ih = 2.26 |
| TLA = 3.48 |

| Surface Data | | | | |
|---|---|---|---|---|
| Surface No. i | Curvature Radius r | Surface Distance d | Refractive Index Nd | Abbe Number vd |
| (Object Surface) | Infinity | Infinity | | |
| Stop | Infinity | −0.100 | | |
| 1* | 1.344 | 0.527 | 1.5346 | 56.16 |
| 2* | −3.346 | 0.034 | | |
| 3* | −4.924 | 0.300 | 1.6142 | 25.58 |
| 4* | 3.059 | 0.560 | | |

TABLE 1-continued

| | | | | |
|---|---|---|---|---|
| 5* | −3.821 | 0.613 | 1.5346 | 56.16 |
| 6* | −0.763 | 0.036 | | |
| 7* | 4.343 | 0.400 | 1.5346 | 56.16 |
| 8* | 0.662 | 0.250 | | |
| 9 | Infinity | 0.210 | 1.5168 | 64.20 |
| 10 | Infinity | 0.623 | | |
| Image Plane | infinity | | | |

| Lens | Start Surface | Focal Length |
|---|---|---|
| Constituent Lens Data | | |
| 1 | 1 | 1.867 |
| 2 | 3 | −3.029 |
| 3 | 5 | 1.667 |
| 4 | 7 | −1.518 |
| Composite Focal Length | | |
| f12 | | 3.615 |
| f34 | | 22.196 |

Aspheric Surface Data

| | 1st Surface | 2nd Surface | 3rd Surface | 4th Surface |
|---|---|---|---|---|
| k | −2.548E−01 | 0.000E+00 | 0.000E+00 | −5.764E−02 |
| A4 | −2.698E−02 | 4.854E−01 | 5.673E−01 | 2.529E−01 |
| A6 | 1.230E−01 | −2.371E+00 | −2.206E+00 | −3.346E−01 |
| A8 | −9.851E−01 | 6.115E+00 | 5.654E+00 | 3.421E−01 |
| A10 | 2.014E+00 | −8.047E+00 | −6.810E+00 | 5.099E−01 |
| A12 | −1.795E+00 | 3.937E+00 | 3.226E+00 | −5.118E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −6.591E+00 | −4.975E+00 | 0.000E+00 | −5.729E+00 |
| A4 | 1.852E−01 | −4.839E−02 | −3.259E−01 | −1.906E−01 |
| A6 | −4.928E−01 | 1.048E−03 | 1.192E−01 | 1.192E−01 |
| A8 | 1.150E+00 | 6.438E−02 | 9.796E−03 | −6.064E−02 |
| A10 | −1.997E+00 | 4.744E−03 | −6.506E−03 | 1.920E−02 |
| A12 | 1.814E+00 | −7.520E−02 | −3.045E−03 | −3.355E−03 |
| A14 | −6.960E−01 | 5.174E−02 | 1.420E−03 | 1.696E−04 |
| A16 | −6.412E−04 | −1.145E−02 | −1.477E−04 | 1.817E−05 |

As shown in Table 9, the imaging lens in Example 1 satisfies all the conditional expressions (1) to (7).

Figure 2:
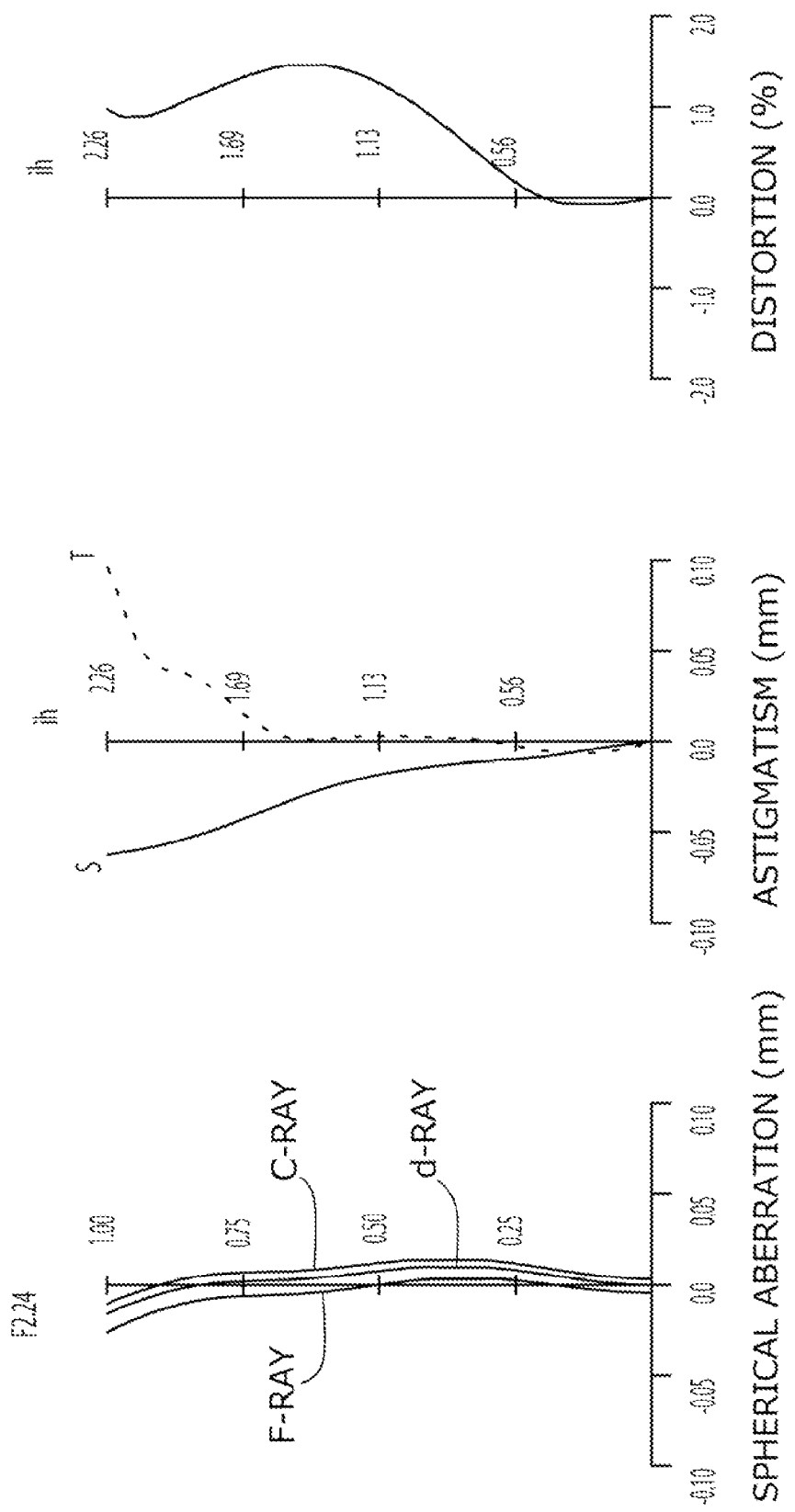
FIG. 2 shows spherical aberration, astigmatism, and distortion of the imaging lens in Example 1.
Figure 3:
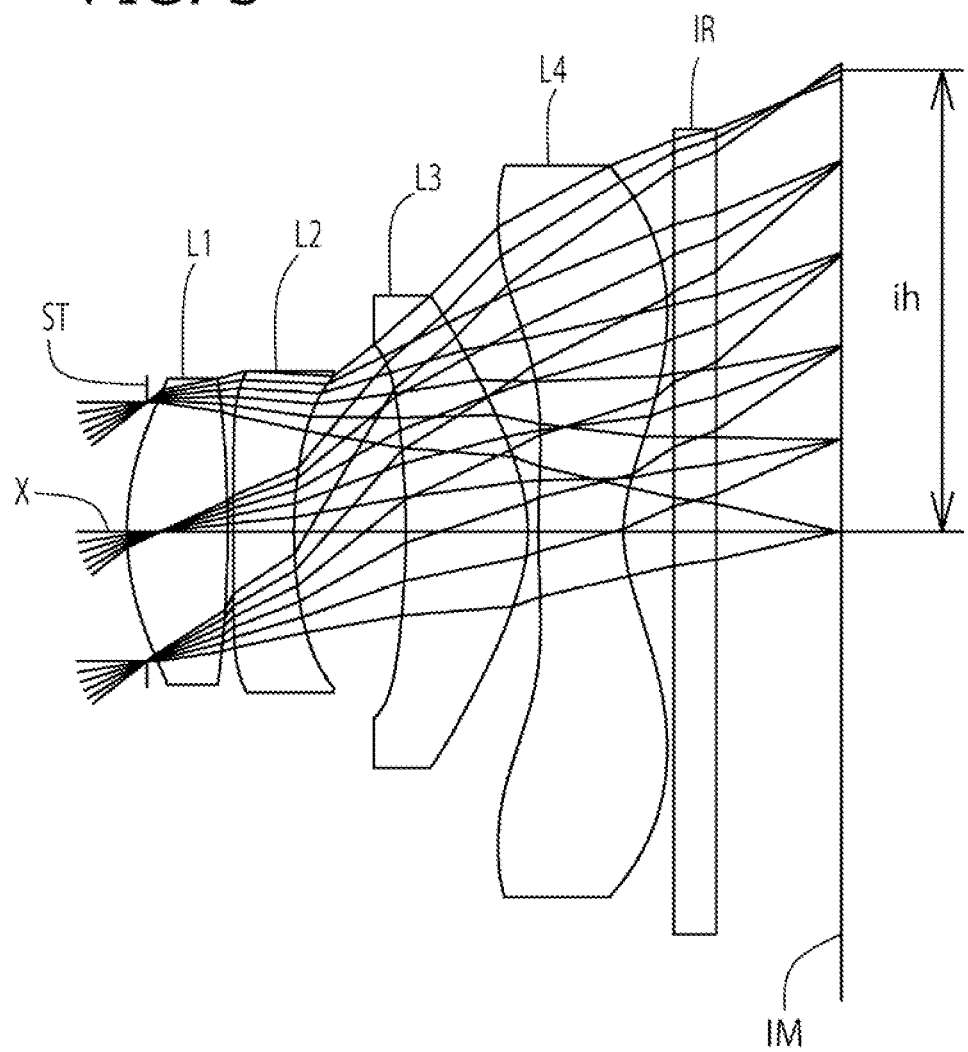
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S at d-ray and the amount of aberration on tangential image surface T at d-ray (the same is true for FIGS. 4, 6, 8, 10, 12, 14, and 16). As shown in FIG. 2, each aberration is corrected properly.

In Example 1, total track length TLA is 3.48 mm and the ratio of total track length TLA to maximum image height ih (TLA/2ih) is 0.77, which suggests that the imaging lens is compact. Also, the imaging lens provides a relatively wide field of view of about 75 degrees and high brightness with an F-value of about 2.2.

EXAMPLE 2

The basic lens data of Example 2 is shown below in Table 2.

TABLE 2

Example 2 in mm f = 2.89
Fno = 2.25
ω(deg) = 38.0
ih = 2.30
TLA = 3.48

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.100 | | |
| 1* | 1.343 | 0.500 | 1.5438 | 55.57 |
| 2* | −5.487 | 0.030 | | |
| 3* | −16.761 | 0.300 | 1.6142 | 25.58 |
| 4* | 2.528 | 0.555 | | |
| 5* | −3.760 | 0.609 | 1.5346 | 56.16 |
| 6* | −0.821 | 0.052 | | |
| 7* | 4.558 | 0.422 | 1.5346 | 56.16 |
| 8* | 0.739 | 0.250 | | |
| 9 | Infinity | 0.210 | 1.5168 | 64.20 |
| 10 | Infinity | 0.626 | | |
| Image Plane | Infinity | | | |

| Lens | Start Surface | Focal Length |
|---|---|---|
| Constituent Lens Data | | |
| 1 | 1 | 2.037 |
| 2 | 3 | −3.555 |
| 3 | 5 | 1.832 |
| 4 | 7 | −1.716 |
| Composite Focal Length | | |
| f12 | | 3.663 |
| f34 | | 18.133 |

Aspheric Surface Data

| | 1st Surface | 2nd Surface | 3rd Surface | 4th Surface |
|---|---|---|---|---|
| k | 1.887E−01 | 0.000E+00 | 0.000E+00 | −1.658E+00 |
| A4 | −4.009E−02 | 2.856E−01 | 3.807E−01 | 2.424E−01 |
| A6 | 3.393E−02 | −2.074E+00 | −2.068E+00 | −5.114E−01 |
| A8 | −7.032E−01 | 6.083E+00 | 5.980E+00 | 9.155E−01 |
| A10 | 1.333E+00 | −8.079E+00 | −6.837E+00 | 4.578E−02 |
| A12 | −1.114E+00 | 4.072E+00 | 2.927E+00 | −4.114E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 7.078E+00 | −4.724E+00 | 0.000E+00 | −5.573E+00 |
| A4 | 1.307E−01 | −7.304E−02 | −3.067E−01 | −1.933E−01 |
| A6 | −1.682E−01 | 5.321E−02 | 1.163E−01 | 1.190E−01 |
| A8 | 3.462E−01 | 1.126E−02 | 7.651E−03 | −5.932E−02 |
| A10 | −1.256E+00 | −1.971E−02 | −6.270E−03 | 1.890E−02 |
| A12 | 1.885E+00 | −5.940E−02 | −2.890E−03 | −3.379E−03 |
| A14 | −1.225E+00 | 6.911E−02 | 1.432E−03 | 2.234E−04 |
| A16 | 1.710E−01 | −1.987E−02 | −1.573E−04 | 7.610E−06 |

As shown in Table 9, the imaging lens in Example 2 satisfies all the conditional expressions (1) to (7).

Figure 4:
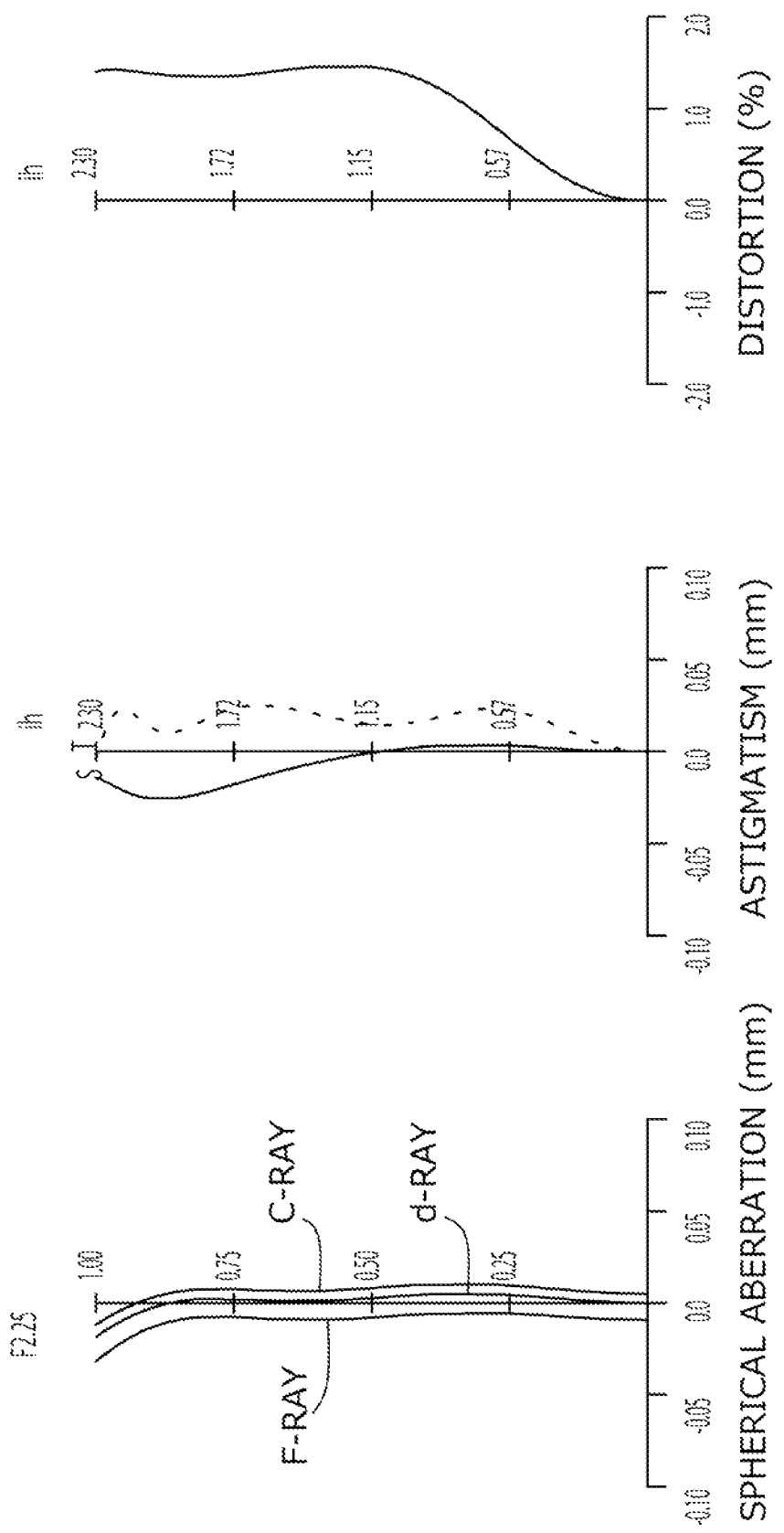
FIG. 4 shows spherical aberration, astigmatism, and distortion of the imaging lens in Example 2.
Figure 5:
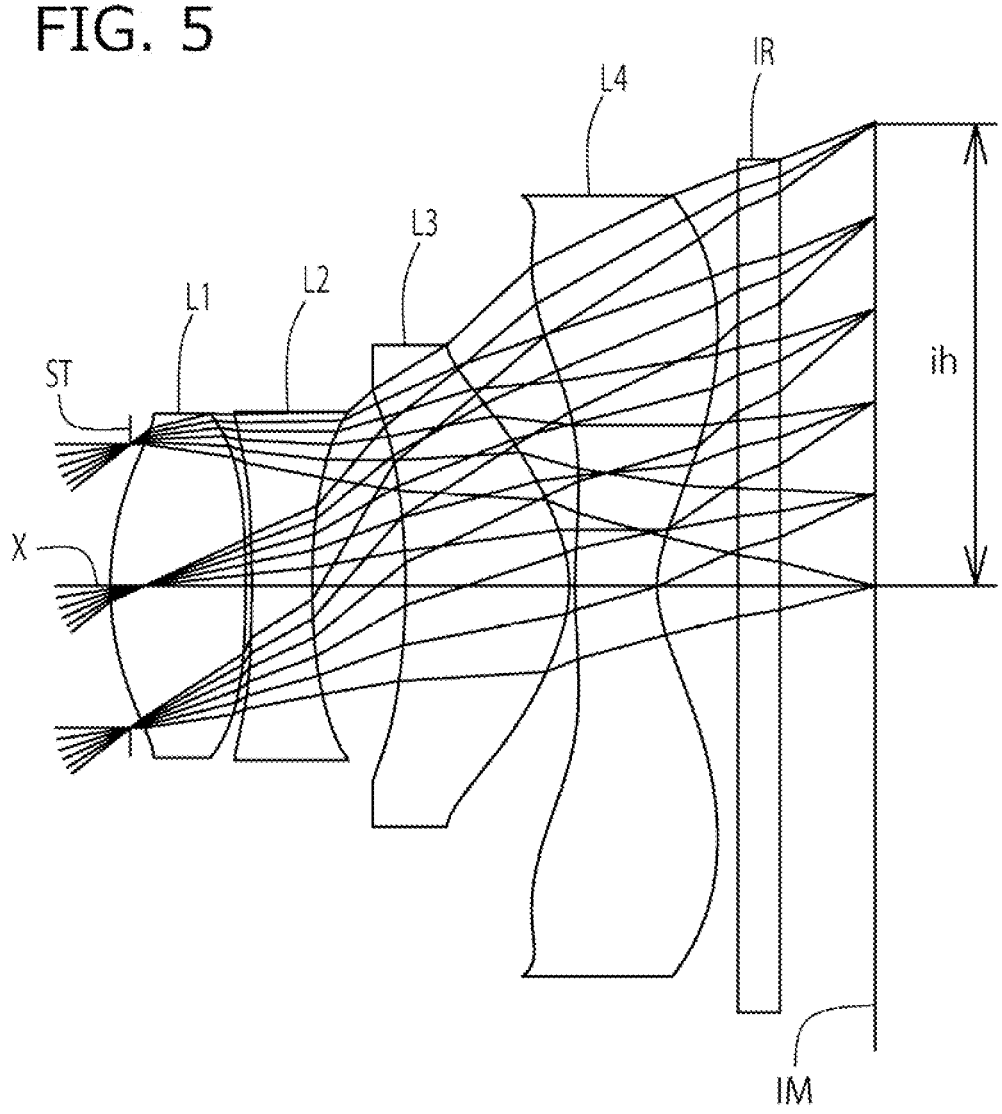
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, total track length TLA is 3.48 mm and the ratio of total track length TLA to maximum image height ih (TLA/2ih) is 0.76, which suggests that the imaging lens is compact. Also, the imaging lens provides a relatively wide field of view of about 76 degrees and high brightness with an F-value of about 2.2.

EXAMPLE 3

The basic lens data of Example 3 is shown below in Table 3.

TABLE 3

Example 3 in mm f = 2.88
Fno = 2.04
ω(deg) = 38.1
ih = 2.30
TLA = 3.73

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.100 | | |
| 1* | 1.468 | 0.672 | 1.5438 | 55.57 |
| 2* | −4.375 | 0.030 | | |
| 3* | −5.883 | 0.300 | 1.6142 | 25.58 |
| 4* | 3.685 | 0.464 | | |
| 5* | −3.178 | 0.815 | 1.5346 | 56.16 |
| 6* | −0.677 | 0.030 | | |
| 7* | 3.537 | 0.407 | 1.5346 | 56.16 |
| 8* | 0.584 | 0.400 | | |
| 9 | Infinity | 0.210 | 1.5168 | 64.20 |
| 10 | Infinity | 0.476 | | |
| Image Plane | Infinity | | | |

| Lens | Start Surface | Focal Length |
|---|---|---|

Constituent Lens Data

| 1 | 1 | 2.107 |
| 2 | 3 | −3.645 |
| 3 | 5 | 1.445 |
| 4 | 7 | −1.374 |

Composite Focal Length

| f12 | 3.799 |
| f34 | 12.116 |

Aspheric Surface Data

| | 1st Surface | 2nd Surface | 3rd Surface | 4th Surface |
|---|---|---|---|---|
| k | 8.696E−01 | 0.000E+00 | 0.000E+00 | −3.749E−01 |
| A4 | −5.026E−02 | 3.342E−01 | 3.947E−01 | 2.103E−01 |
| A6 | −2.862E−02 | −2.587E+00 | −2.618E+00 | −4.832E−01 |
| A8 | −1.403E−01 | 5.997E+00 | 6.024E+00 | 8.413E−01 |
| A10 | 1.778E−01 | −6.734E+00 | −6.538E+00 | −5.807E−01 |
| A12 | −3.444E−01 | 2.844E+00 | 2.852E+00 | 1.911E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 2.899E+00 | −4.281E+00 | 0.000E+00 | −4.864E+00 |
| A4 | 1.164E−01 | −1.777E−01 | −3.266E−01 | −1.709E−01 |
| A6 | −3.020E−01 | 6.175E−02 | 1.185E−01 | 1.090E−01 |
| A8 | 4.881E−01 | −1.403E−03 | 5.445E−03 | −5.331E−02 |
| A10 | −1.036E+00 | 3.722E−03 | −5.885E−03 | 1.689E−02 |
| A12 | 1.657E+00 | −5.267E−02 | −2.689E−03 | −3.202E−03 |
| A14 | −1.431E+00 | 7.486E−02 | 1.460E−03 | 3.031E−04 |
| A16 | 5.161E−01 | −2.464E−02 | −1.777E−04 | −8.942E−06 |

As shown in Table 9, the imaging lens in Example 3 satisfies all the conditional expressions (1) to (7).

Figure 6:
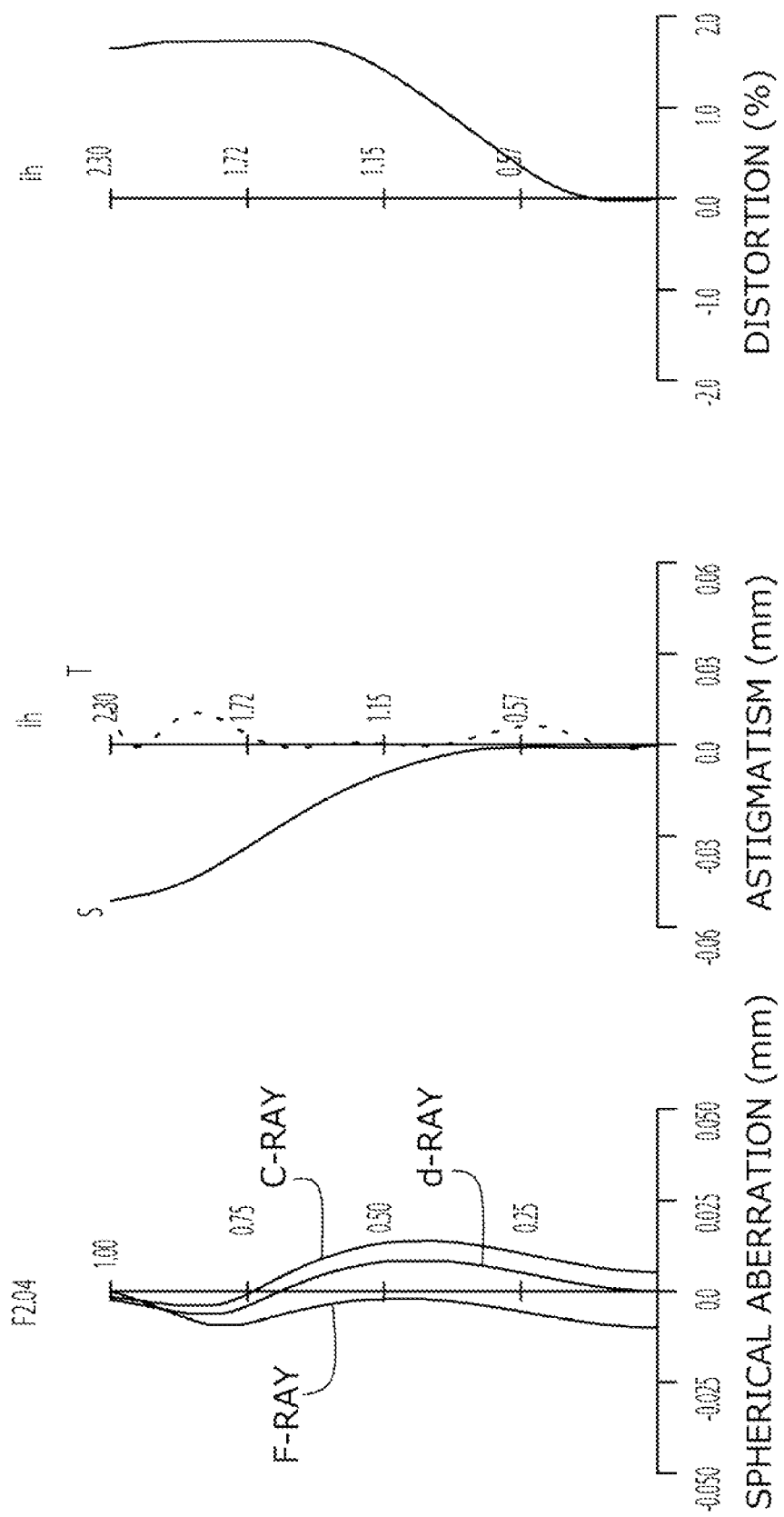
FIG. 6 shows spherical aberration, astigmatism, and distortion of the imaging lens in Example 3.
Figure 7:
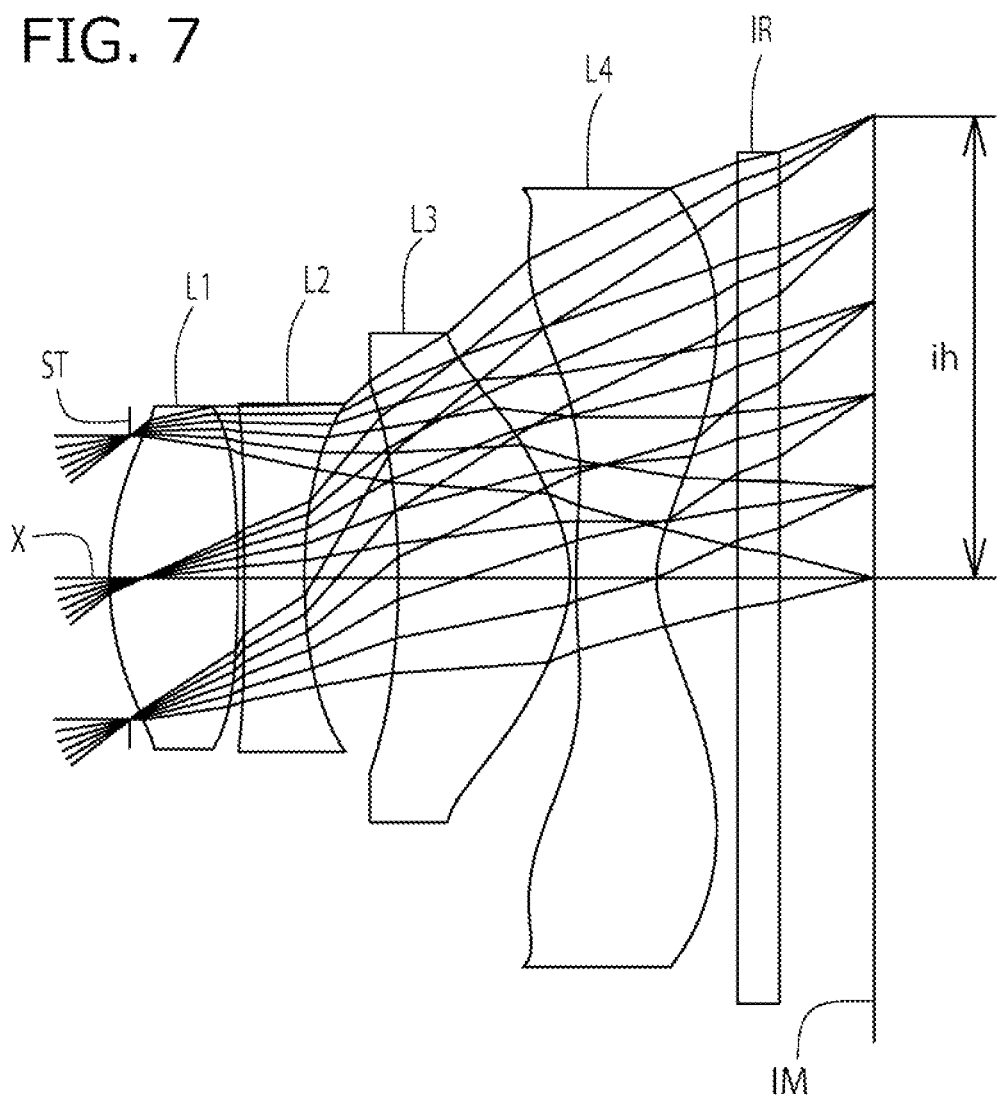
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, total track length TLA is 3.73 mm and the ratio of total track length TLA to maximum image height ih (TLA/2ih) is 0.81, which suggests that the imaging lens is compact. Also, the imaging lens provides a relatively wide field of view of about 76 degrees and high brightness with an F-value of about 2.0.

EXAMPLE 4

The basic lens data of Example 4 is shown below in Table 4.

TABLE 4

Example 4 in mm f = 2.88
Fno = 2.04
ω(deg) = 38.0
ih = 2.30
TLA = 3.73

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.100 | | |
| 1* | 1.486 | 0.638 | 1.5438 | 55.57 |
| 2* | −4.093 | 0.030 | | |
| 3* | −8.068 | 0.300 | 1.6142 | 25.58 |
| 4* | 3.033 | 0.466 | | |
| 5* | −3.469 | 0.855 | 1.5346 | 56.16 |
| 6* | −0.682 | 0.030 | | |
| 7* | 3.449 | 0.400 | 1.5346 | 56.16 |
| 8* | 0.578 | 0.400 | | |
| 9 | Infinity | 0.210 | 1.5168 | 64.20 |
| 10 | Infinity | 0.473 | | |
| Image Plane | Infinity | | | |

| Lens | Start Surface | Focal Length |
|---|---|---|

Constituent Lens Data

| 1 | 1 | 2.089 |
| 2 | 3 | −3.552 |
| 3 | 5 | 1.435 |
| 4 | 7 | −1.365 |

Composite Focal Length

| f12 | 3.819 |
| f34 | 11.764 |

Aspheric Surface Data

| | 1st Surface | 2nd Surface | 3rd Surface | 4th Surface |
|---|---|---|---|---|
| k | 1.329E+00 | 0.000E+00 | 0.000E+00 | −5.936E−02 |
| A4 | −6.962E−02 | 5.222E−01 | 5.915E−01 | 2.378E−01 |
| A6 | −3.346E−02 | −2.660E+00 | −2.725E+00 | −5.256E−01 |
| A8 | −1.967E−01 | 5.862E+00 | 5.931E+00 | 8.844E−01 |
| A10 | 2.914E−01 | −6.693E+00 | −6.563E+00 | −6.433E−01 |
| A12 | −4.165E−01 | 2.917E+00 | 2.915E+00 | 2.135E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −1.915E−01 | −4.520E+00 | 0.000E+00 | −4.900E+00 |
| A4 | 1.235E−01 | −1.680E−01 | −3.320E−01 | −1.701E−01 |
| A6 | −3.734E−01 | 4.095E−02 | 1.137E−01 | 1.068E−01 |
| A8 | 6.560E−01 | 1.803E−02 | 7.181E−03 | −5.209E−02 |
| A10 | −1.199E+00 | 2.599E−03 | −5.164E−03 | 1.665E−02 |
| A12 | 1.638E+00 | −5.981E−02 | −2.816E−03 | −3.220E−03 |
| A14 | −1.245E+00 | 7.548E−02 | 1.368E−03 | 3.138E−04 |
| A16 | 4.009E−01 | −2.392E−02 | −1.587E−04 | −9.704E−06 |

As shown in Table 9, the imaging lens in Example 4 satisfies all the conditional expressions (1) to (7).

Figure 8:
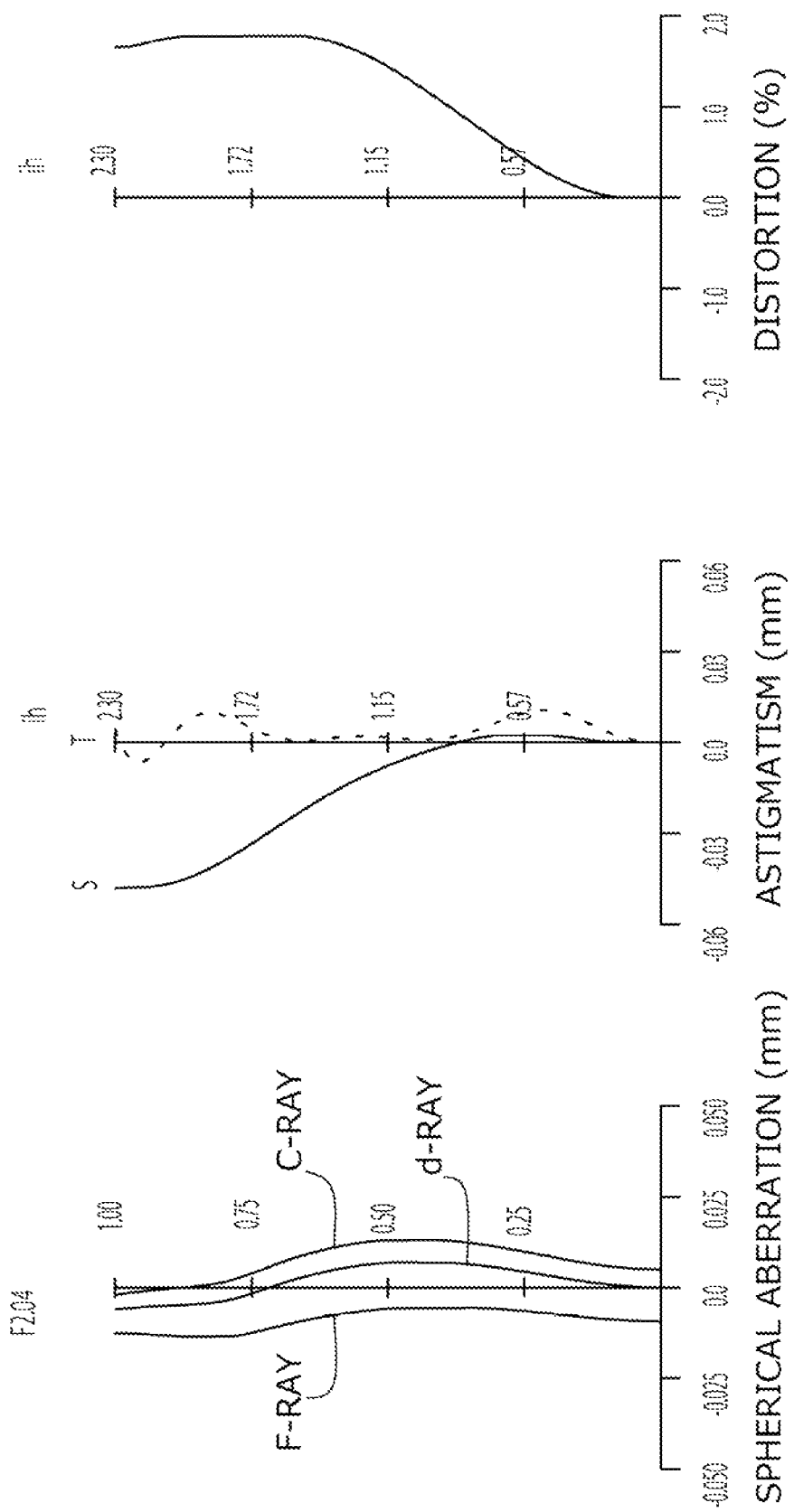
FIG. 8 shows spherical aberration, astigmatism, and distortion of the imaging lens in Example 4.
Figure 9:
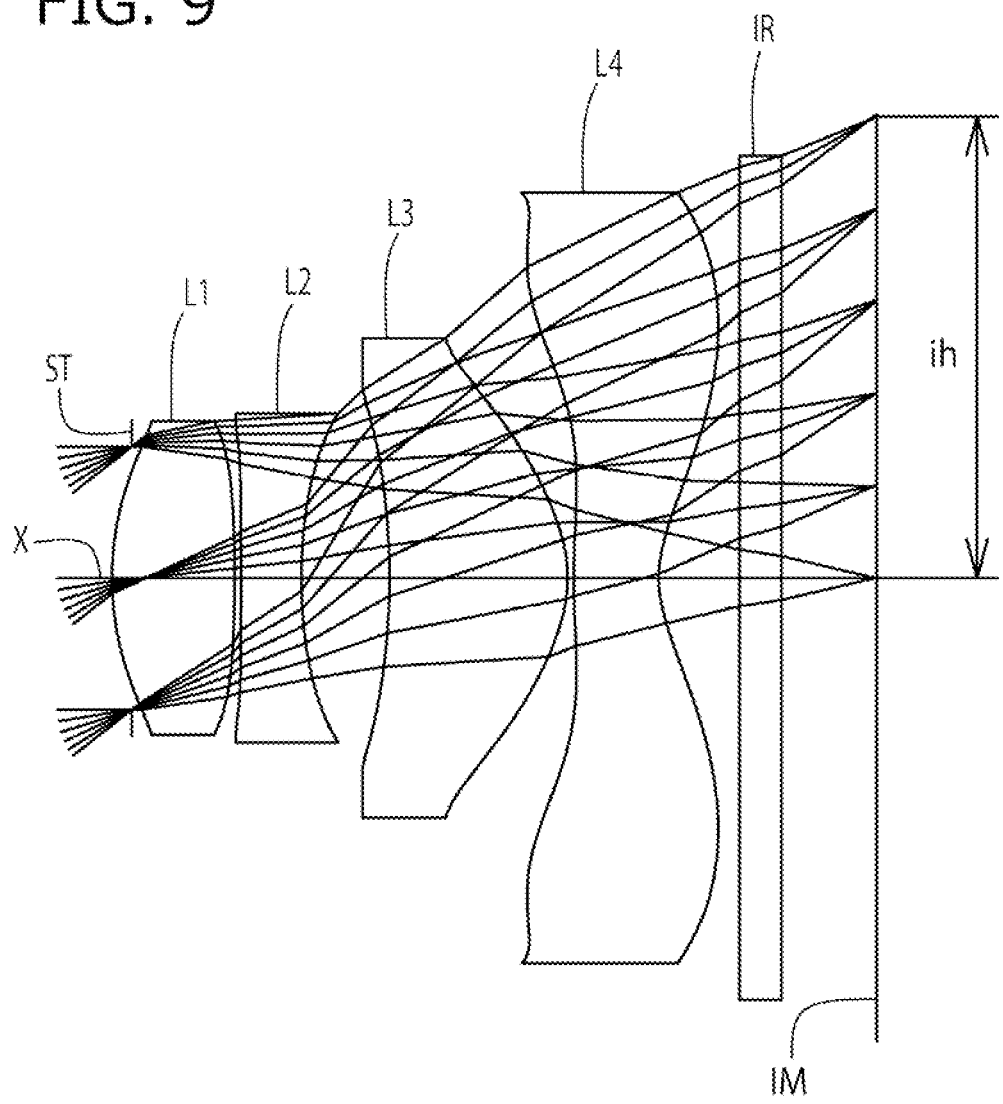
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, total track length TLA is 3.73 mm and the ratio of total track length TLA to maximum image height ih (TLA/2ih) is 0.81, which suggests that the imaging lens is compact. Also, the imaging lens provides a relatively wide field of view of about 76 degrees and high brightness with an F-value of about 2.0.

EXAMPLE 5

The basic lens data of Example 5 is shown below in Table 5.

TABLE 5

Example 5 in mm f = 2.88
Fno = 2.20
ω(deg) = 38.1
ih = 2.30
TLA = 3.73

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.100 | | |
| 1* | 1.455 | 0.610 | 1.5438 | 55.57 |
| 2* | −4.328 | 0.031 | | |
| 3* | −9.705 | 0.300 | 1.6142 | 25.58 |
| 4* | 2.871 | 0.437 | | |
| 5* | −3.165 | 0.888 | 1.5346 | 56.16 |
| 6* | −0.678 | 0.030 | | |
| 7* | 4.064 | 0.422 | 1.5346 | 56.16 |
| 8* | 0.596 | 0.400 | | |
| 9 | Infinity | 0.210 | 1.5168 | 64.20 |
| 10 | Infinity | 0.472 | | |
| Image Plane | Infinity | | | |

| Lens | Start Surface | Focal Length |
|---|---|---|
| Constituent Lens Data | | |
| 1 | 1 | 2.080 |
| 2 | 3 | −3.575 |
| 3 | 5 | 1.435 |
| 4 | 7 | −1.364 |
| Composite Focal Length | | |
| f12 | | 3.764 |
| f34 | | 12.628 |

Aspheric Surface Data

| | 1st Surface | 2nd Surface | 3rd Surface | 4th Surface |
|---|---|---|---|---|
| k | 1.157E+00 | 0.000E+00 | 0.000E+00 | 1.360E+00 |
| A4 | −6.351E−02 | 4.848E−01 | 5.703E−01 | 2.537E−01 |
| A6 | −4.379E−02 | −2.684E+00 | −2.792E+00 | −5.809E−01 |
| A8 | −2.378E−01 | 5.826E+00 | 5.872E+00 | 9.179E−01 |
| A10 | 4.615E−01 | −6.834E+00 | −6.501E+00 | −6.186E−01 |
| A12 | −6.830E−01 | 3.224E+00 | 3.138E+00 | 2.143E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 7.227E−01 | −4.253E+00 | 0.000E+00 | −4.978E+00 |
| A4 | 1.181E−01 | −1.972E−01 | −3.183E−01 | −1.654E−01 |
| A6 | −3.648E−01 | 8.729E−02 | 1.132E−01 | 1.035E−01 |
| A8 | 6.721E−01 | −6.462E−03 | 6.646E−03 | −5.109E−02 |
| A10 | −1.175E+00 | 6.426E−03 | −5.149E−03 | 1.654E−02 |
| A12 | 1.604E+00 | −5.422E−02 | −2.787E−03 | −3.221E−03 |
| A14 | −1.283E+00 | 7.625E−02 | 1.372E−03 | 3.157E−04 |
| A16 | 4.503E−01 | −2.608E−02 | −1.617E−04 | −9.870E−06 |

As shown in Table 9, the imaging lens in Example 5 satisfies all the conditional expressions (1) to (7).

Figure 10:
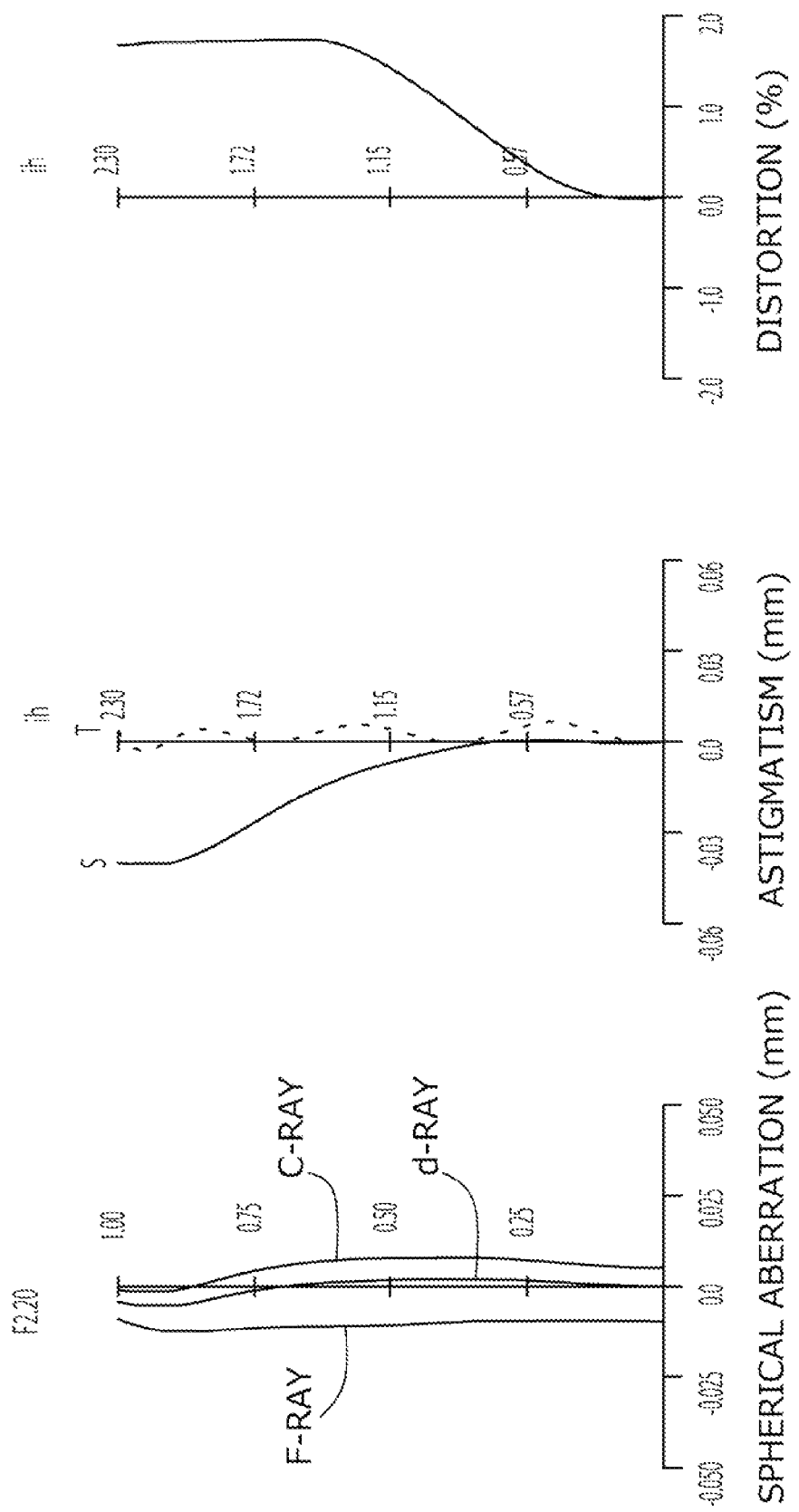
FIG. 10 shows spherical aberration, astigmatism, and distortion of the imaging lens in Example 5.
Figure 11:
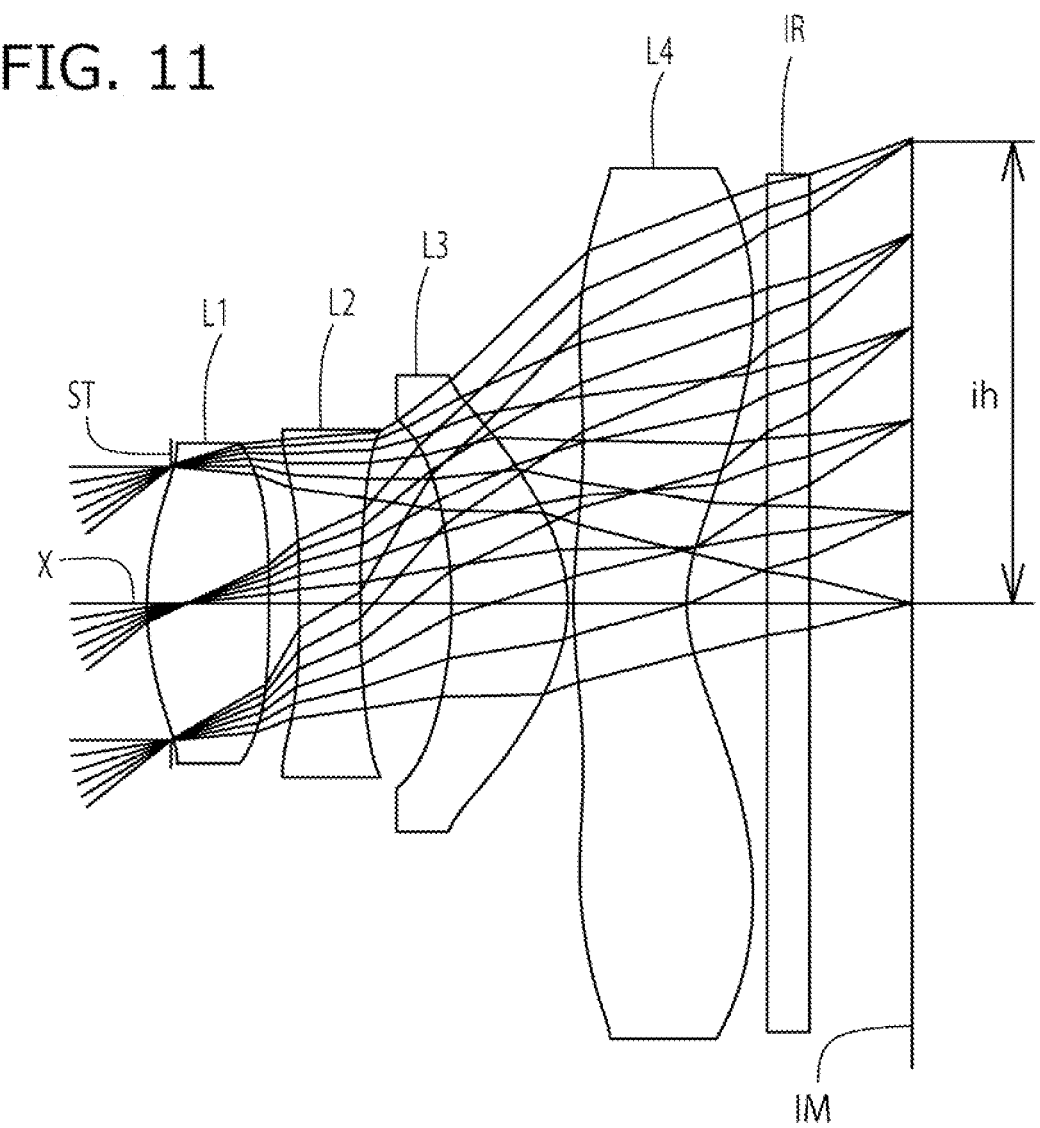
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In Example 5, total track length TLA is 3.73 mm and the ratio of total track length TLA to maximum image height ih (TLA/2ih) is 0.81, which suggests that the imaging lens is compact. Also, the imaging lens provides a relatively wide field of view of about 76 degrees and high brightness with an F-value of about 2.2.

EXAMPLE 6

The basic lens data of Example 6 is shown below in Table 6.

TABLE 6

Example 6 in mm f = 2.83
Fno = 2.07
ω(deg) = 38.4
ih = 2.30
TLA = 3.70

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.120 | | |
| 1* | 1.563 | 0.605 | 1.5346 | 56.16 |
| 2* | −8.930 | 0.151 | | |
| 3* | −7.948 | 0.302 | 1.6349 | 23.97 |
| 4* | 5.952 | 0.454 | | |
| 5* | −2.016 | 0.579 | 1.5346 | 56.16 |
| 6* | −0.779 | 0.030 | | |
| 7* | 2.790 | 0.561 | 1.5346 | 56.16 |
| 8* | 0.766 | 0.400 | | |
| 9 | Infinity | 0.210 | 1.5168 | 64.17 |
| 10 | Infinity | 0.515 | | |
| Image Plane | Infinity | | | |

| Lens | Start Surface | Focal Length |
|---|---|---|
| Constituent Lens Data | | |
| 1 | 1 | 2.539 |
| 2 | 3 | −5.315 |
| 3 | 5 | 2.041 |
| 4 | 7 | −2.188 |
| Composite Focal Length | | |
| f12 | | 4.000 |
| f34 | | 8.425 |

Aspheric Surface Data

| | 1st Surface | 2nd Surface | 3rd Surface | 4th Surface |
|---|---|---|---|---|
| k | −6.856E−01 | 0.000E+00 | 0.000E+00 | −1.675E+01 |
| A4 | −6.380E−02 | −1.748E−01 | −1.496E−01 | 7.795E−02 |
| A6 | 2.866E−01 | −3.185E−01 | −1.797E−01 | −2.064E−01 |
| A8 | −1.437E+00 | 6.212E−01 | 3.008E−02 | 3.906E−01 |
| A10 | 2.805E+00 | −1.198E+00 | 1.030E+00 | −2.371E−01 |
| A12 | −3.180E+00 | 1.610E+00 | −6.575E−01 | −1.852E−02 |
| A14 | 1.125E+00 | −9.787E−01 | −8.697E−02 | 1.715E−01 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −5.822E−01 | 0.000E+00 | −4.970E+00 |
| A4 | 9.035E−02 | 4.909E−01 | −2.338E−01 | −1.114E−01 |
| A6 | −1.247E−01 | −6.340E−01 | 1.072E−01 | 5.741E−02 |
| A8 | −1.449E−01 | 8.313E−01 | −1.605E−02 | −2.184E−02 |
| A10 | 2.789E−01 | −5.957E−01 | −1.779E−03 | 4.516E−03 |
| A12 | −2.116E−01 | 2.120E−01 | 6.111E−04 | −2.749E−04 |

TABLE 6-continued

| | | | | |
|---|---|---|---|---|
| A14 | −3.118E−02 | 5.078E−03 | 4.171E−06 | −5.087E−05 |
| A16 | 0.000E+00 | 0.000E+00 | −7.167E−06 | 6.625E−06 |

As shown in Table 9, the imaging lens in Example 6 satisfies all the conditional expressions (1) to (7).

Figure 12:
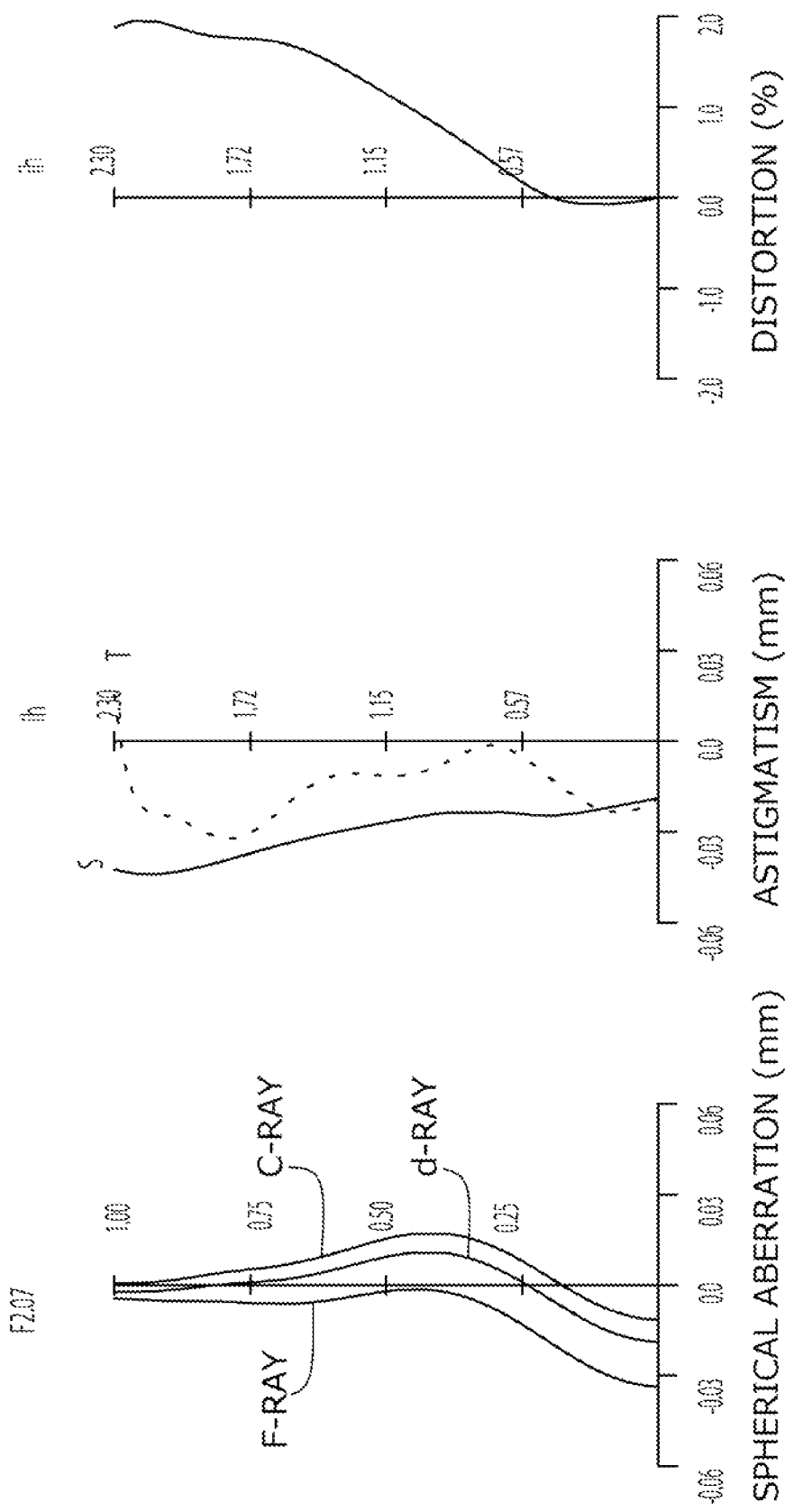
FIG. 12 shows spherical aberration, astigmatism, and distortion of the imaging lens in Example 6.

FIG. 12 shows spherical aberration (mm), astigmatism (mm), and distortion (%) of the imaging lens in Example 6. As shown in FIG. 12, each aberration is corrected properly.

In Example 6, total track length TLA is 3.70 mm and the ratio of total track length TLA to maximum image height ih (TLA/2ih) is 0.81, which suggests that the imaging lens is compact. Also, the imaging lens provides a relatively wide field of view of about 77 degrees and high brightness with an F-value of about 2.0.

EXAMPLE 7

The basic lens data of Example 7 is shown below in Table 7.

TABLE 7

Example 7 in mm f = 2.86
Fno = 2.07
ω(deg) = 38.2
ih = 2.30
TLA = 3.71

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.131 | | |
| 1* | 1.597 | 0.710 | 1.5346 | 56.16 |
| 2* | −5.460 | 0.117 | | |
| 3* | −2.317 | 0.269 | 1.6349 | 23.97 |
| 4* | −9.455 | 0.518 | | |
| 5* | −1.603 | 0.438 | 1.5346 | 56.16 |
| 6* | −0.726 | 0.142 | | |
| 7* | 2.955 | 0.487 | 1.5346 | 56.16 |
| 8* | 0.782 | 0.400 | | |
| 9 | Infinity | 0.210 | 1.5168 | 64.17 |
| 10 | Infinity | 0.516 | | |
| Image Plane | Infinity | | | |

| Lens | Start Surface | Focal Length |
|---|---|---|
| Constituent Lens Data | | |
| 1 | 1 | 2.395 |
| 2 | 3 | −4.906 |
| 3 | 5 | 2.116 |
| 4 | 7 | −2.156 |
| Composite Focal Length | | |
| f12 | | 3.989 |
| f34 | | 10.173 |

Aspheric Surface Data

| | 1st Surface | 2nd Surface | 3rd Surface | 4th Surface |
|---|---|---|---|---|
| k | −2.488E−01 | 0.000E+00 | 0.000E+00 | 4.835E+01 |
| A4 | −5.414E−02 | −8.851E−02 | 2.045E−02 | 1.762E−01 |
| A6 | 3.120E−01 | −5.988E−01 | −7.666E−01 | −5.149E−01 |
| A8 | −1.361E+00 | 5.808E−01 | 1.185E−01 | 5.674E−01 |
| A10 | 2.458E+00 | −5.448E−01 | 1.614E−01 | −4.777E−01 |
| A12 | −1.800E+00 | 6.002E−01 | −1.839E+00 | 2.216E−01 |
| A14 | −4.257E−01 | −4.325E−01 | 7.157E−01 | −8.974E−02 |
| A16 | 0.000E+00 | 0.000E+00 | 0.000E+00 | 0.000E+00 |

TABLE 7-continued

| | 5th Surface | 6th Surface | 7th Surface | 8th Surface |
|---|---|---|---|---|
| k | 0.000E+00 | −5.893E−01 | 0.000E+00 | −5.258E+00 |
| A4 | 1.254E−01 | 5.572E−01 | −2.179E−01 | −1.142E−01 |
| A6 | −1.776E−03 | −6.129E−01 | 9.278E−02 | 5.840E−02 |
| A8 | −4.772E−01 | 7.701E−01 | −1.034E−02 | −2.223E−02 |
| A10 | 2.991E−01 | −3.874E−01 | −2.491E−03 | 4.483E−03 |
| A12 | 4.785E−01 | −5.620E−02 | 2.770E−04 | −1.957E−04 |
| A14 | −7.615E−01 | 1.630E−01 | 1.350E−04 | −7.575E−05 |
| A16 | 0.000E+00 | 0.000E+00 | −2.040E−05 | 8.708E−06 |

As shown in Table 9, the imaging lens in Example 7 satisfies all the conditional expressions (1) to (7).

Figure 14:
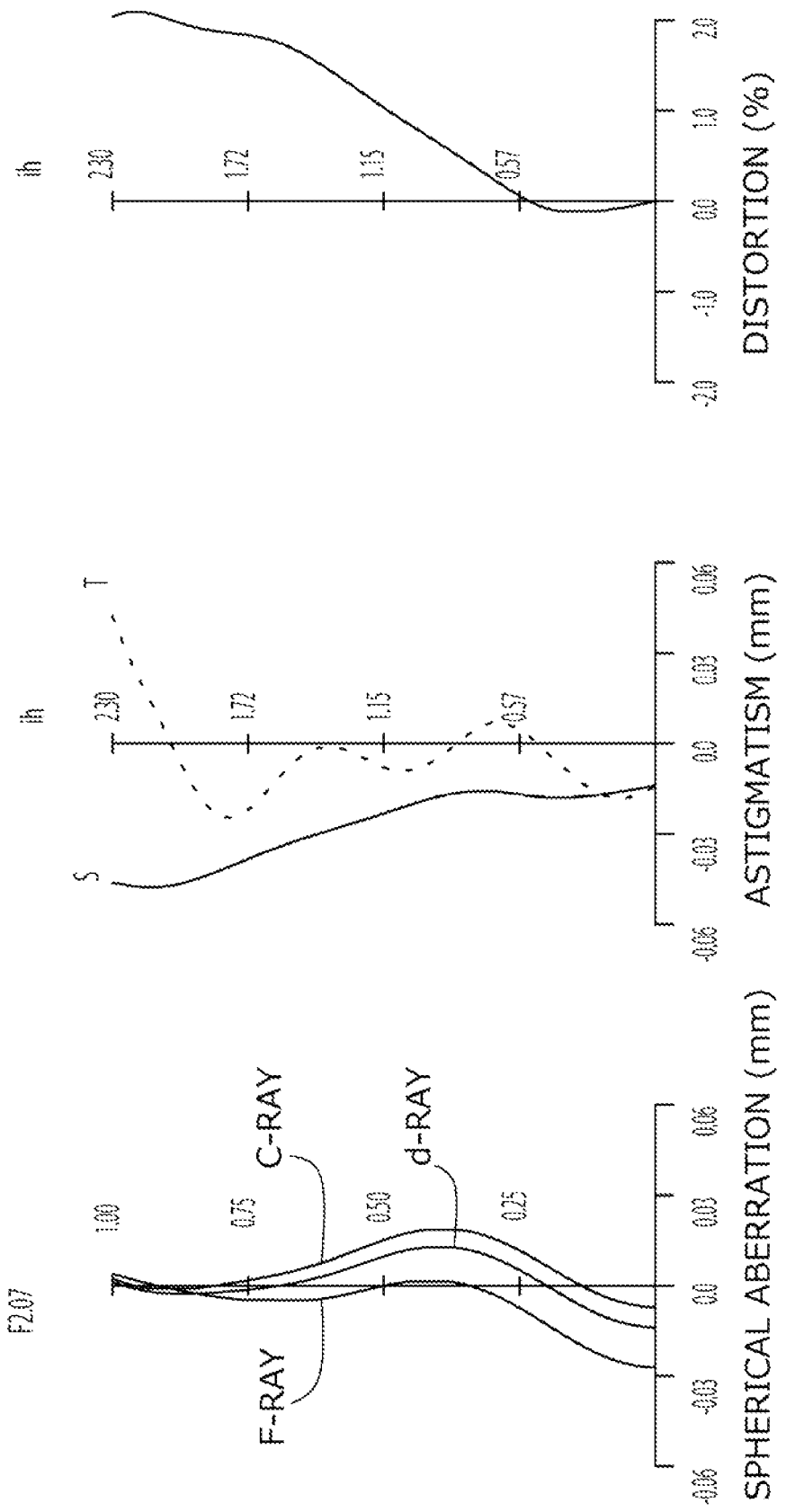
FIG. 14 shows spherical aberration, astigmatism, and distortion of the imaging lens in Example 7.
Figure 15:
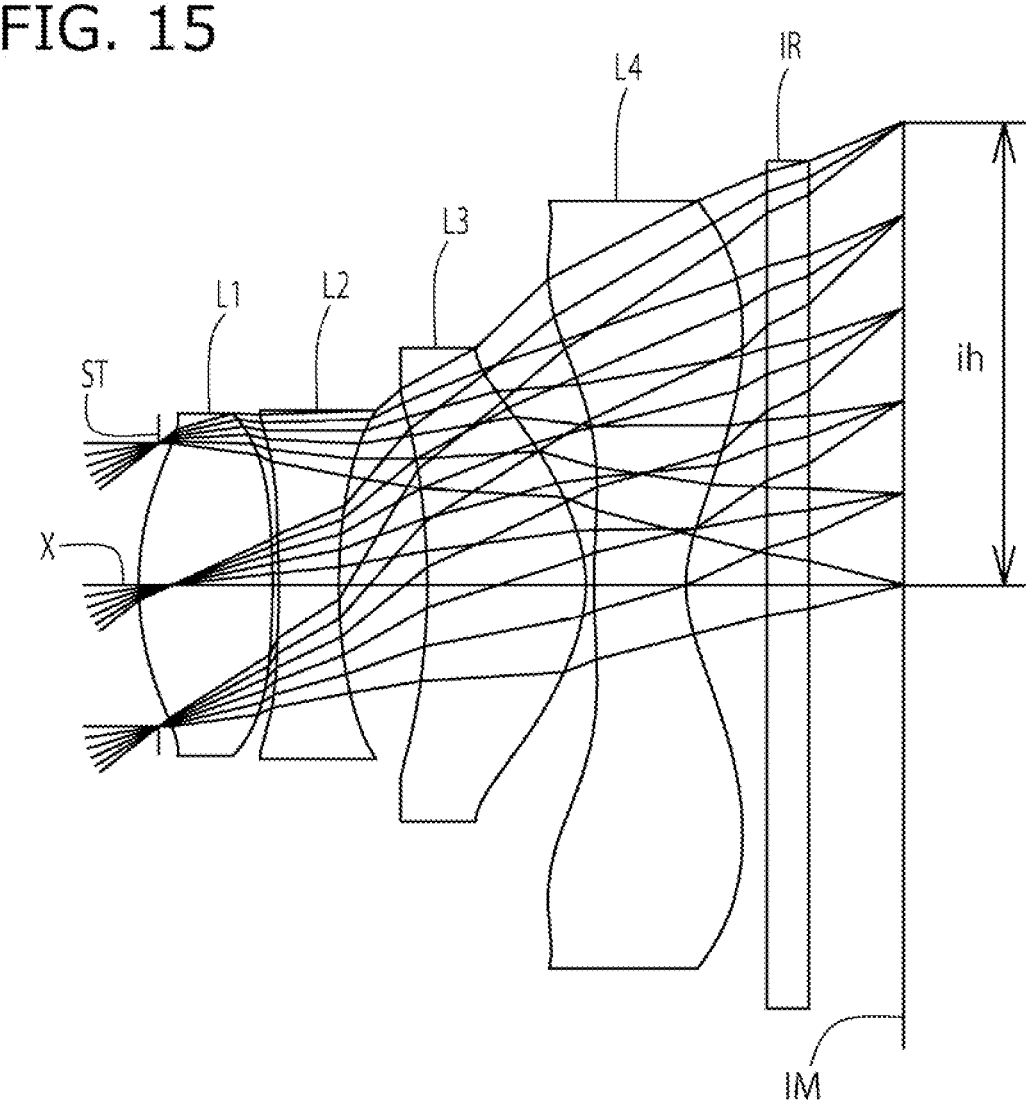
FIG. 15 is a schematic view showing the general configuration of an imaging lens in Example 8.

FIG. 14 shows spherical aberration (mm), astigmatism (mm), and distortion (%) of the imaging lens in Example 7. As shown in FIG. 14, each aberration is corrected properly.

In Example 7, total track length TLA is 3.71 mm and the ratio of total track length TLA to maximum image height ih (TLA/2ih) is 0.81, which suggests that the imaging lens is compact. Also, the imaging lens provides a relatively wide field of view of about 76 degrees and high brightness with an F-value of about 2.0.

EXAMPLE 8

The basic lens data of Example 8 is shown below in Table 8.

TABLE 8

Example 8 in mm f = 2.88
Fno = 2.04
ω(deg) = 38.0
ih = 2.30
TLA = 3.73

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.100 | | |
| 1* | 1.482 | 0.664 | 1.5438 | 55.57 |
| 2* | −3.700 | 0.030 | | |
| 3* | −5.672 | 0.300 | 1.6142 | 25.58 |
| 4* | 3.316 | 0.438 | | |
| 5* | −3.210 | 0.790 | 1.5346 | 56.16 |
| 6* | −0.760 | 0.042 | | |
| 7* | 4.049 | 0.456 | 1.5346 | 56.16 |
| 8* | 0.693 | 0.400 | | |
| 9 | Infinity | 0.210 | 1.5168 | 64.20 |
| 10 | Infinity | 0.472 | | |
| Image Plane | Infinity | | | |

| Lens | Start Surface | Focal Length |
|---|---|---|
| Constituent Lens Data | | |
| 1 | 1 | 2.038 |
| 2 | 3 | −3.364 |
| 3 | 5 | 1.674 |
| 4 | 7 | −1.642 |
| Composite Focal Length | | |
| f12 | | 3.822 |
| f34 | | 11.362 |

TABLE 8-continued

Aspheric Surface Data

|  | 1st Surface | 2nd Surface | 3rd Surface | 4th Surface |
|---|---|---|---|---|
| k | 1.443E+00 | 0.000E+00 | 0.000E+00 | −2.349E+00 |
| A4 | −9.323E−02 | 4.145E−01 | 5.052E−01 | 2.376E−01 |
| A6 | 9.938E−02 | −2.681E+00 | −2.932E+00 | −5.380E−01 |
| A8 | −7.424E−01 | 5.531E+00 | 6.109E+00 | 8.280E−01 |
| A10 | 1.288E+00 | −5.699E+00 | −6.255E+00 | −5.005E−01 |
| A12 | −1.298E+00 | 2.194E+00 | 2.679E+00 | 1.407E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

|  | 5th Surface | 6th Surface | 7th Surface | 8th Surface |
|---|---|---|---|---|
| k | 5.171E+00 | −4.155E+00 | 0.000E+00 | −4.974E+00 |
| A4 | 1.332E−01 | −1.932E−01 | −3.046E−01 | −1.577E−01 |
| A6 | −3.095E−01 | 1.213E−01 | 9.850E−02 | 9.657E−02 |
| A8 | 5.975E−01 | −8.208E−02 | 6.310E−03 | −4.791E−02 |
| A10 | −1.107E+00 | 5.938E−02 | −8.129E−04 | 1.579E−02 |
| A12 | 1.524E+00 | −4.850E−02 | −3.810E−03 | −3.248E−03 |
| A14 | −1.165E+00 | 6.635E−02 | 1.244E−03 | 3.556E−04 |
| A16 | 3.814E−01 | −2.551E−02 | −1.192E−04 | −1.434E−05 |

As shown in Table 9, the imaging lens in Example 8 satisfies all the conditional expressions (1) to (7).

Figure 16:
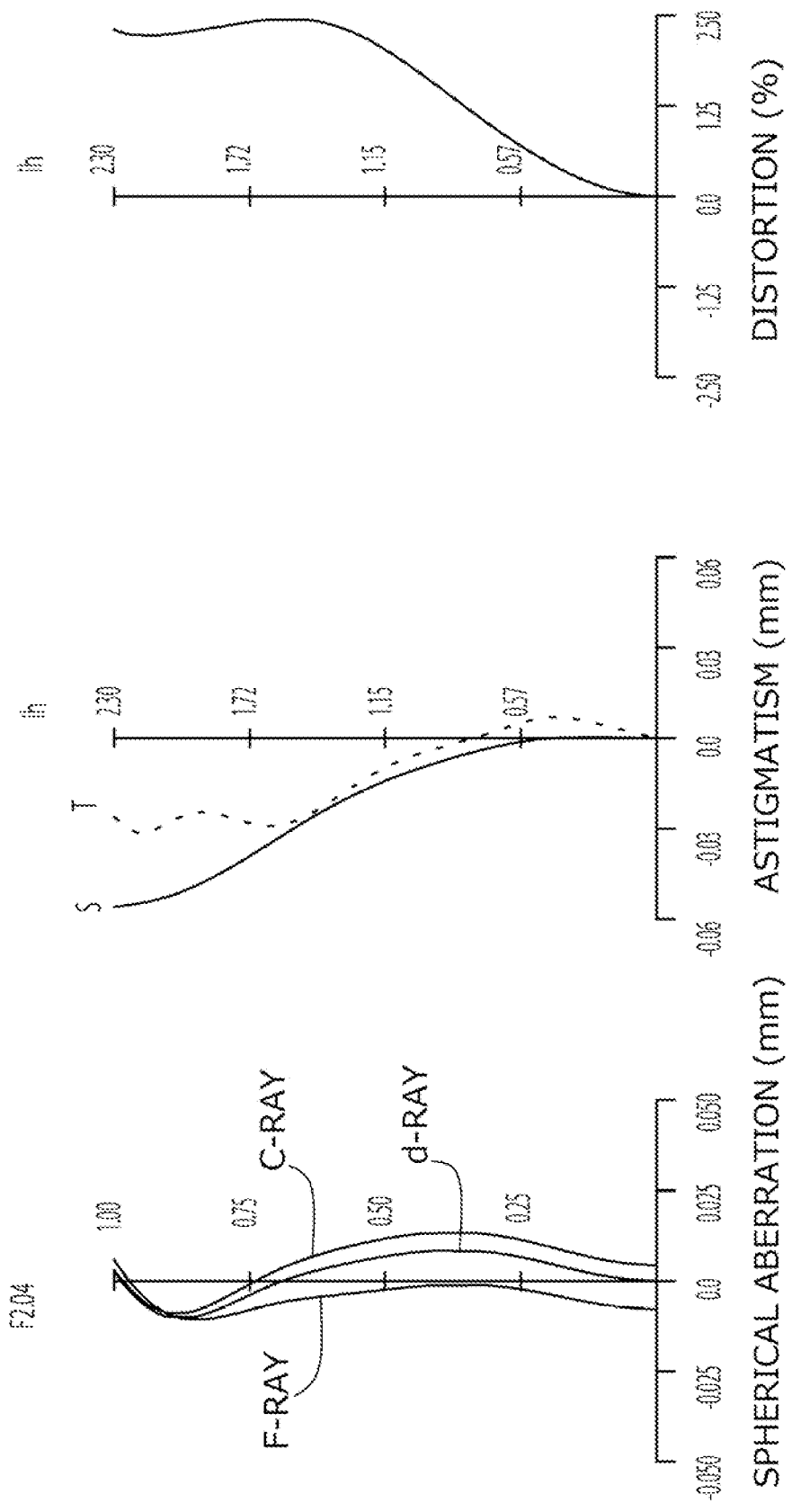
FIG. 16 shows spherical aberration, astigmatism, and distortion of the imaging lens in Example 8.

FIG. 16 shows spherical aberration (mm), astigmatism (mm), and distortion (%) of the imaging lens in Example 8. As shown in FIG. 16, each aberration is corrected properly.

In Example 8, total track length TLA is 3.73 mm and the ratio of total track length TLA to maximum image height ih (TLA/2ih) is 0.81, which suggests that the imaging lens is compact. Also, the imaging lens provides a relatively wide field of view of about 76 degrees and high brightness with an F-value of about 2.0.

As explained above, the imaging lens according to the preferred embodiment of the present invention is compact with total track length TLA of 3.8 mm or less and a ratio of total track length TLA to maximum image height ih (TLA/2ih) of 0.9 or less. Also, the imaging lens provides a wide field of view of 70 degrees or more and high brightness with an F-value of less than 2.4, and corrects aberrations properly.

Table 9 shows data on Examples 1 to 8 in relation to the conditional expressions (1) to (7).

TABLE 9

|  | Example 1 | Example 2 | Example 3 | Example 4 | Example 5 | Example 6 | Example 7 | Example 8 |
|---|---|---|---|---|---|---|---|---|
| Conditional Expression (1) 0.15 < f12/f34 < 0.5 | 0.16 | 0.20 | 0.31 | 0.32 | 0.30 | 0.47 | 0.39 | 0.34 |
| Conditional Expression (2) 0.1 < \|r1/r2\| < 0.5 | 0.40 | 0.24 | 0.34 | 0.36 | 0.34 | 0.18 | 0.29 | 0.40 |
| Conditional Expression (3) 1.0 < f1/f3 < 1.6 | 1.12 | 1.11 | 1.46 | 1.46 | 1.45 | 1.24 | 1.13 | 1.22 |
| Conditional Expression (4) −6.5 < r3/f < −0.7 | −1.71 | −5.80 | −2.04 | −2.80 | −3.37 | −2.81 | −0.81 | −1.97 |
| Conditional Expression (5) 3.3 < r7/r8 < 7.5 | 6.56 | 6.17 | 6.06 | 5.97 | 6.82 | 3.64 | 3.78 | 5.84 |
| Conditional Expression (6) TLA/2Ih < 0.9 | 0.77 | 0.76 | 0.81 | 0.81 | 0.81 | 0.81 | 0.81 | 0.81 |
| Conditional Expression (7) 1h/f > 0.7 | 0.78 | 0.79 | 0.80 | 0.80 | 0.80 | 0.81 | 0.80 | 0.80 |

When the imaging lens according to the preferred embodiment of the present invention is used for an optical system built in an image pickup device mounted in an increasingly compact and low-profile mobile terminal such as a smart phone, mobile phone or PDA (Personal Digital Assistant), or a game console or an information terminal such as a PC, it provides a function as a compact high-performance camera.

The effects of the present invention are as follows.

According to the present invention, there is provided a compact imaging lens with a small F-value which corrects various aberrations properly and provides a wide field of view.

What is claimed is:

1. An imaging lens for a solid-state image sensor in which elements are arranged in order from an object side to an image side, comprising:
   a first lens with positive refractive power having a convex surface on the object side;
   a second lens with negative refractive power having a concave surface on the object side near an optical axis;
   a third lens with positive refractive power as a meniscus lens having a convex surface on the image side; and
   a fourth lens with negative refractive power as a double-sided aspheric lens, wherein
   an F-value is smaller than 2.4; and
   conditional expressions (1) and (3) below are satisfied:

$$0.2 < f12/f34 < 0.5 \quad (1)$$

$$1.0 < f1/f3 < 1.6 \quad (3)$$

where
f1: focal length of the first lens
f3: focal length of the third lens
f12: composite focal length of the first lens and the second lens
f34: composite focal length of the third lens and the fourth lens.

2. The imaging lens according to claim 1, wherein an aperture stop is arranged on the object side of the first lens.

3. The imaging lens according to claim 1, wherein the fourth lens has a meniscus shape having a concave surface on the image side near the optical axis.

4. The imaging lens according to claim 1, where in a conditional expression (2) below is satisfied:

$$0.1 < |r1/r2| < 0.5 \quad (2)$$

where
r1: curvature radius of the object-side surface of the first lens
r2: curvature radius of the image-side surface of the first lens.

5. The imaging lens according to claim 1, wherein a conditional expression (4) below is satisfied:

$$-6.5 < r3/f < -0.7 \quad (4)$$

where
f: focal length of an overall optical system of the imaging lens r3: curvature radius of the object-side surface of the second lens.

6. The imaging lens according to claim 1, wherein a conditional expression (5) below is satisfied:

$$3.3 < r7/r8 < 7.5 \qquad (5)$$

where r7: curvature radius of the object-side surface of the fourth lens r8: curvature radius of the image-side surface of the fourth lens.

7. The imaging lens according to claim 1, wherein a conditional expression (6) below is satisfied:

$$TLA/2ih < 0.9 \qquad (6)$$

where

TLA: distance on the optical axis from the object-side surface of an optical element located nearest to the object to an image plane with a filter removed ih: maximum image height.

8. The imaging lens according to claim 1, wherein a conditional expression (7) below is satisfied:

$$ih/f > 0.7 \qquad (7)$$

where f: focal length of an overall optical system of the imaging lens ih: maximum image height.

* * * * *